United States Patent
Hao et al.

(10) Patent No.: US 12,549,231 B2
(45) Date of Patent: Feb. 10, 2026

(54) CHANNEL STATE INFORMATION (CSI) REFERENCE SIGNAL CAPABILITY REPORTING FOR MULTIPLE TRANSMIT RECEIVE POINT CSI MEASUREMENT

(71) Applicant: QUALCOMM Incorporated, San Diego, CA (US)

(72) Inventors: Chenxi Hao, Beijing (CN); Mostafa Khoshnevisan, San Diego, CA (US); Lei Xiao, San Jose, CA (US); Tao Luo, San Diego, CA (US); Peter Gaal, San Diego, CA (US); Wanshi Chen, San Diego, CA (US); Xiaoxia Zhang, San Diego, CA (US); Jing Sun, San Diego, CA (US); Juan Montojo, San Diego, CA (US); Yu Zhang, San Diego, CA (US); Hao Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 374 days.

(21) Appl. No.: 18/044,421

(22) PCT Filed: Oct. 23, 2020

(86) PCT No.: PCT/CN2020/123166
§ 371 (c)(1),
(2) Date: Mar. 8, 2023

(87) PCT Pub. No.: WO2022/082713
PCT Pub. Date: Apr. 28, 2022

(65) Prior Publication Data
US 2023/0361832 A1    Nov. 9, 2023

(51) Int. Cl.
*H04L 5/00* (2006.01)
*H04B 7/0456* (2017.01)
*H04B 7/06* (2006.01)

(52) U.S. Cl.
CPC ......... *H04B 7/0626* (2013.01); *H04B 7/0456* (2013.01); *H04L 5/0048* (2013.01)

(58) Field of Classification Search
None
See application file for complete search history.

(56) References Cited

U.S. PATENT DOCUMENTS

2013/0258965 A1   10/2013   Geirhofer et al.
2018/0049047 A1*   2/2018   Lin ........................ H04W 24/02
(Continued)

FOREIGN PATENT DOCUMENTS

CN   109644455 A   4/2019
CN   110190941 A   8/2019
(Continued)

OTHER PUBLICATIONS

3GPP TSG RAN WG1 Meeting #102-e, R1-200abcd, Aug. 17-28, 2020.*

(Continued)

*Primary Examiner* — Abdelillah Elmejjarmi
(74) *Attorney, Agent, or Firm* — Harrity & Harrity LLP

(57) ABSTRACT

Various aspects of the present disclosure generally relate to wireless communication. In some aspects, a user equipment (UE) may determine one or more channel state information (CSI) reference signal (CSI-RS) capabilities associated with multiple transmit receive point (multi-TRP) CSI measurement, each CSI-RS capability indicating at least one of a number of active CSI-RS resources or a number of active CSI-RS ports supported by the UE for multi-TRP CSI measurement. The UE may transmit an indication of the one or more CSI-RS capabilities associated with multi-TRP CSI measurement. Numerous other aspects are provided.

30 Claims, 10 Drawing Sheets

(56) References Cited

U.S. PATENT DOCUMENTS

| | | | |
|---|---|---|---|
| 2018/0123654 A1 | 5/2018 | Park et al. | |
| 2020/0145158 A1 | 5/2020 | Zhou et al. | |
| 2020/0169303 A1 | 5/2020 | Park et al. | |
| 2021/0258809 A1* | 8/2021 | Gao | H04L 5/0057 |
| 2022/0255588 A1* | 8/2022 | Park | H04B 7/0626 |
| 2023/0044464 A1* | 2/2023 | Jin | H04B 7/0417 |
| 2023/0048322 A1* | 2/2023 | Takahashi | H04B 7/0628 |
| 2023/0061346 A1* | 3/2023 | Park | H04W 72/232 |

FOREIGN PATENT DOCUMENTS

| | | |
|---|---|---|
| CN | 110235496 A | 9/2019 |
| WO | 2019140389 A1 | 7/2019 |
| WO | 2020037207 A1 | 2/2020 |
| WO | 2020089863 A1 | 5/2020 |

OTHER PUBLICATIONS

Huawei, et al., "Discussion Summary for CSI Enhancements MTRP and FR1 FDD Reciprocity", 3GPP TSG RAN WG1 Meeting #102-e, R1-2006973, 3rd Generation Partnership Project (3GPP), Mobile Competence Centre, 650, Route Des Lucioles, F-06921 Sophia-Antipolis Cedex, France, France, vol. RAN WG1, No. E-meeting; Aug. 17, 2020-Aug. 28, 2020, Aug. 25, 2020, 35 Pages, XP052348342, Section 3.2, p. 16-p. 18.

Supplementary Partial European Search Report—EP20958295—Search Authority—Munich—Jul. 3, 2024.

International Search Report and Written Opinion—PCT/CN2020/123166—ISA/EPO—Jul. 21, 2021.

Qualcomm Incorporated: "Remaining Issues on CSI Enhancement for MU-MIMO Support", 3GPP TSG RAN WG1#100-e, R1-2002550, Apr. 30, 2020 (Apr. 30, 2020), 15 Pages, section 4.

Intel Corporation: "Remaining details on CSI Enhancements for MU-MIMO", 3GPP TSG RAN WG1 #99, R1-1912221, 3GPP, Mobile Competence Centre, 650, Route Des Lucioles, F-06921, Sophia-antipolis Cedex, France, vol. RAN WG1, No. Reno, USA, Nov. 18, 2019-Nov. 22, 2019, Nov. 9, 2019, XP051823298, pp. 1-6, Section 2.1, p. 1-p. 3.

Supplementary European Search Report—EP20958295—Search Authority—Munich—Oct. 17, 2024.

* cited by examiner

CHANNEL STATE INFORMATION (CSI) REFERENCE SIGNAL CAPABILITY REPORTING FOR MULTIPLE TRANSMIT RECEIVE POINT CSI MEASUREMENT

CROSS-REFERENCE TO RELATED APPLICATION

This application is a 371 national stage of Patent Cooperation Treaty (PCT) Application No. PCT/CN2020/123166 filed on Oct. 23, 2020, entitled "CHANNEL STATE INFORMATION (CSI) REFERENCE SIGNAL CAPABILITY REPORTING FOR MULTIPLE TRANSMIT RECEIVE POINT CSI MEASUREMENT," which is hereby expressly incorporated by reference herein.

FIELD OF THE DISCLOSURE

Aspects of the present disclosure generally relate to wireless communication and to techniques and apparatuses for channel state information (CSI) reference signal (CSI-RS) capability reporting for multiple transmit receive point (multi-TRP) CSI measurement.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

SUMMARY

Figure 1:
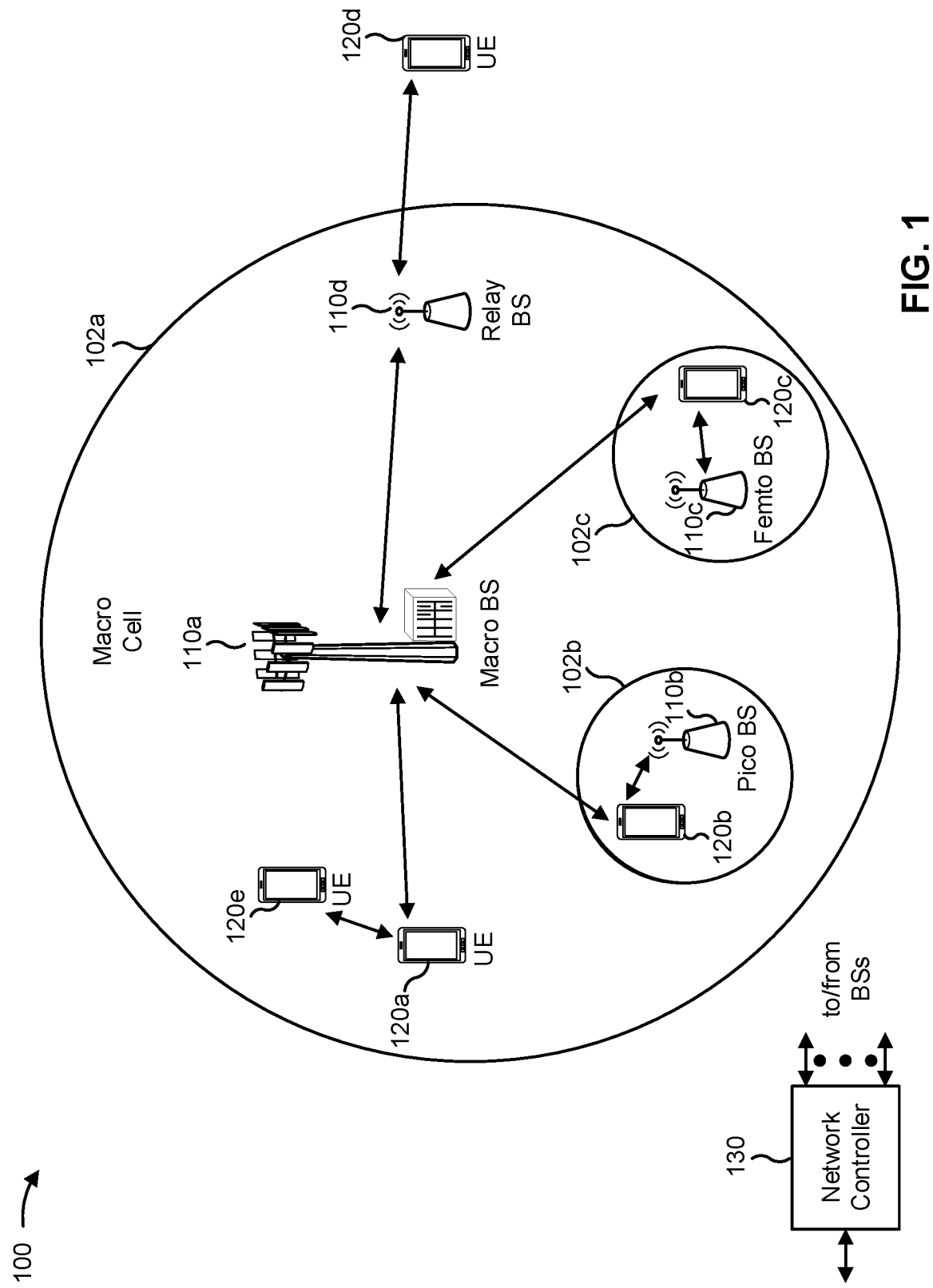
FIG. 1 is a diagram illustrating an example of a wireless network, in accordance with various aspects of the present disclosure.

In some aspects, a method of wireless communication performed by a user equipment (UE) includes determining one or more channel state information (CSI) reference signal (CSI-RS) capabilities associated with multiple transmit receive point (multi-TRP) CSI measurement, each CSI-RS capability indicating at least one of a number of active CSI-RS resources or a number of active CSI-RS ports supported by the UE for multi-TRP CSI measurement; and transmitting an indication of the one or more CSI-RS capabilities associated with multi-TRP CSI measurement.

In some aspects, a method of wireless communication performed by a base station includes receiving, from a UE, an indication of one or more CSI-RS capabilities of the UE associated with multi-TRP CSI measurement, each CSI-RS capability of the UE indicating at least one of a number of active CSI-RS resources or a number of active CSI-RS ports supported by the UE for multi-TRP CSI measurement; and determining a CSI report configuration, or a request, for multi-TRP CSI measurement associated with the UE based at least in part on the one or more CSI-RS capabilities of the UE.

In some aspects, a UE for wireless communication includes a memory and one or more processors operatively coupled to the memory. The memory and the one or more processors may be configured to: determine one or more CSI-RS capabilities associated with multi-TRP CSI measurement, each CSI-RS capability indicating at least one of a number of active CSI-RS resources or a number of active CSI-RS ports supported by the UE for multi-TRP CSI measurement; and transmit an indication of the one or more CSI-RS capabilities associated with multi-TRP CSI measurement.

In some aspects, a base station for wireless communication includes a memory and one or more processors operatively coupled to the memory. The memory and the one or more processors may be configured to: receive, from a UE, an indication of one or more CSI-RS capabilities of the UE associated with multi-TRP CSI measurement, each CSI-RS capability of the UE indicating at least one of a number of active CSI-RS resources or a number of active CSI-RS ports supported by the UE for multi-TRP CSI measurement; and determine a CSI report configuration, or a request, for multi-TRP CSI measurement associated with the UE based at least in part on the one or more CSI-RS capabilities of the UE.

In some aspects, a non-transitory computer-readable medium storing a set of instructions for wireless communication includes one or more instructions that, when executed by one or more processors of a UE, cause the UE to: determine one or more CSI-RS capabilities associated with multi-TRP CSI measurement, each CSI-RS capability indicating at least one of a number of active CSI-RS resources or a number of active CSI-RS ports supported by the UE for multi-TRP CSI measurement; and transmit an indication of the one or more CSI-RS capabilities associated with multi-TRP CSI measurement.

In some aspects, a non-transitory computer-readable medium storing a set of instructions for wireless communication includes one or more instructions that, when executed by one or more processors of a base station, cause the base station to: receive, from a UE, an indication of one or more CSI-RS capabilities of the UE associated with multi-TRP CSI measurement, each CSI-RS capability of the UE indicating at least one of a number of active CSI-RS resources or a number of active CSI-RS ports supported by the UE for multi-TRP CSI measurement; and determine a CSI report configuration, or a request, for multi-TRP CSI measurement associated with the UE based at least in part on the one or more CSI-RS capabilities of the UE.

In some aspects, an apparatus for wireless communication includes means for determining one or more CSI-RS capabilities associated with multiple transmit receive point (multi-TRP) CSI measurement, each CSI-RS capability indicating at least one of a number of active CSI-RS resources or a number of active CSI-RS ports supported by the apparatus for multi-TRP CSI measurement; and means for transmitting an indication of the one or more CSI-RS capabilities associated with multi-TRP CSI measurement.

In some aspects, an apparatus for wireless communication includes means for receiving, from a UE, an indication of one or more CSI-RS capabilities of the UE associated with multi-TRP CSI measurement, each CSI-RS capability of the UE indicating at least one of a number of active CSI-RS resources or a number of active CSI-RS ports supported by the UE for multi-TRP CSI measurement; and means for determining a CSI report configuration, or a request, for multi-TRP CSI measurement associated with the UE based at least in part on the one or more CSI-RS capabilities of the UE.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with various aspects of the present disclosure. The wireless network 100 may be or may include elements of a 5G (NR) network, an LTE network, and/or the like. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like. In some aspects, the processor components and the memory components may be coupled together. For example, the processor components (e.g., one or more processors) and the memory components (e.g., a memory) may be operatively coupled, communicatively coupled, electronically coupled, electrically coupled, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, and/or the like. For example, devices of wireless network 100 may communicate using an operating band having a first frequency range (FR1), which may span from 410 MHz to 7.125 GHZ, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-500 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
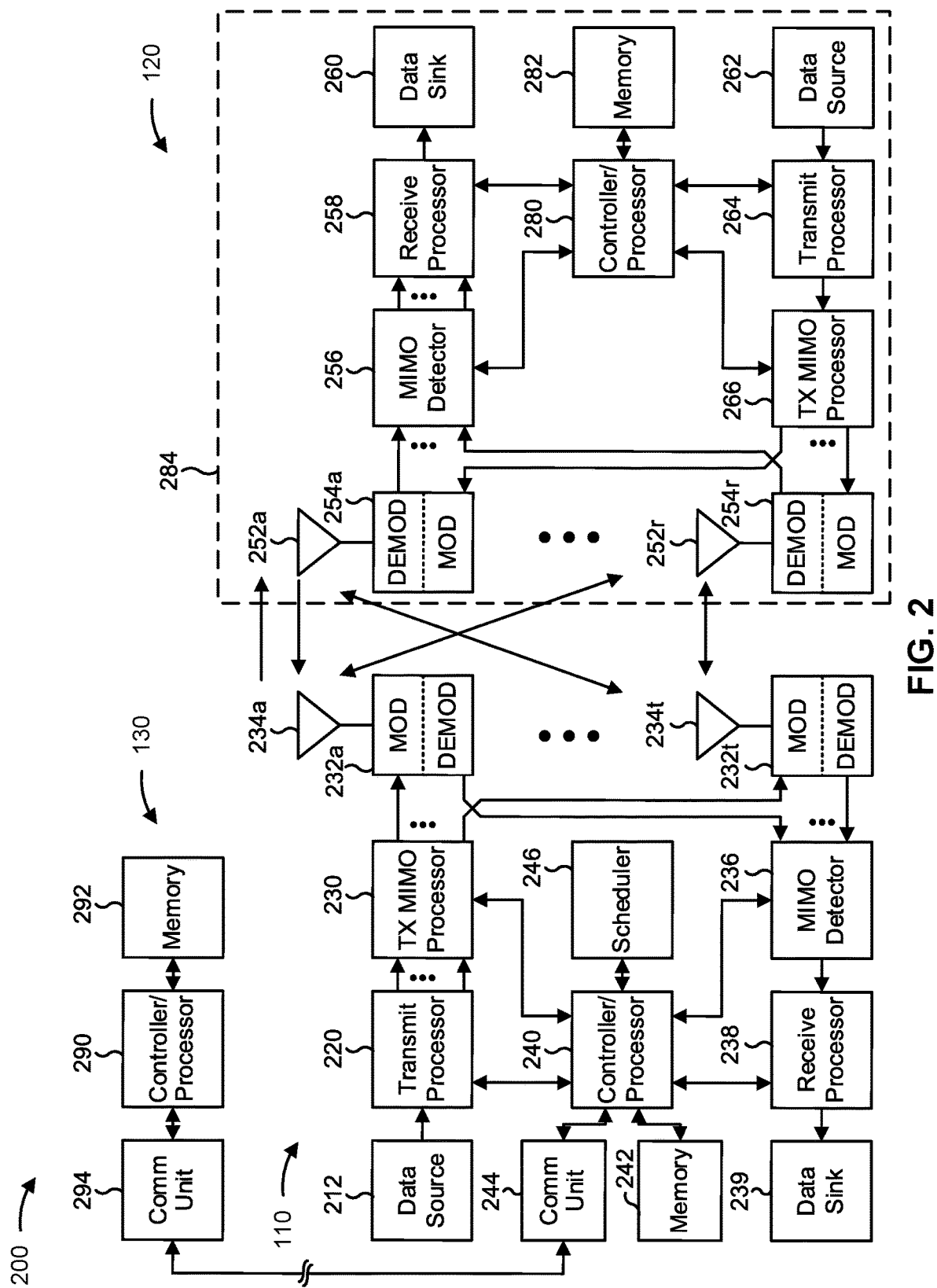
FIG. 2 is a diagram illustrating an example of a base station in communication with a UE in a wireless network, in accordance with various aspects of the present disclosure.

FIG. 2 is a diagram illustrating an example 200 of a base station 110 in communication with a UE 120 in a wireless network 100, in accordance with various aspects of the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., a cell-specific reference signal (CRS), a demodulation reference signal (DMRS), and/or the like) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

On the uplink, at UE 120, a transmit processor 264 may receive and process data from a data source 262 and control information (e.g., for reports that include RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 6-8.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 6-8.

Controller/processor 240 of base station 110, controller/processor 280 of UE 120, and/or any other component(s) of FIG. 2 may perform one or more techniques associated with channel state information (CSI) reference signal (CSI-RS) capability reporting for multiple transmit receive point (multi-TRP) CSI measurement, as described in more detail elsewhere herein. For example, controller/processor 240 of base station 110, controller/processor 280 of UE 120, and/or any other component(s) of FIG. 2 may perform or direct operations of, for example, process 700 of FIG. 7, process 800 of FIG. 8, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code, program code, and/or the like) for wireless communication. For example, the one or more instructions, when executed (e.g., directly, or after compiling, converting, interpreting, and/or the like) by one or more processors of the base station 110 and/or the UE 120, may cause the one or more processors, the UE 120, and/or the base station 110 to perform or direct operations of, for example, process 700 of FIG. 7, process 800 of FIG. 8, and/or other processes as described herein. In some aspects, executing instructions may include running the instructions, converting the instructions, compiling the instructions, interpreting the instructions, and/or the like.

In some aspects, the UE 120 includes means for determining one or more CSI-RS capabilities associated with multi-TRP CSI measurement, each CSI-RS capability indicating at least one of a number of active CSI-RS resources or a number of active CSI-RS ports supported by the UE for multi-TRP CSI measurement, where multi-TRP CSI measurement comprises one or more CSI measurements using at least two CSI port groups associated with different transmission configuration indicator (TCI) states or at least two CSI resources associated with different TCI states, wherein a first CSI port group or a first CSI resource associated with a first TCI state is associated with a transmission from a first TRP and a second CSI port group or a second CSI resource associated with a second TCI state is associated with a transmission from a second TRP; and/or means for transmitting an indication of the one or more CSI-RS capabilities associated with multi-TRP CSI measurement. The means for the UE 120 to perform operations described herein may include, for example, antenna 252, demodulator 254, MIMO detector 256, receive processor 258, transmit processor 264, TX MIMO processor 266, modulator 254, controller/processor 280, and/or memory 282.

In some aspects, the UE 120 includes means for determining at least one of: a number of ports per TRP supported by the UE for multi-TRP CSI measurement, a number of multi-TRP CSI hypotheses supported by the UE for multi-TRP CSI measurement, or a total number of ports supported by the UE for multi-TRP CSI measurement.

In some aspects, the UE 120 includes means for determining at least one of: a number of ports per CSI-RS resource supported by the UE for multi-TRP CSI measurement, or a number of ports per CSI-RS port group supported by the UE for multi-TRP CSI measurement. In some aspects, the UE 120 includes means for determining at least one of: a number of CSI-RS resources supported by the UE for multi-TRP CSI measurement, a number of CSI-RS port group pairs supported by the UE for multi-TRP CSI measurement, or a number of CSI-RS resource pairs supported by the UE for multi-TRP CSI measurement.

In some aspects, the UE 120 includes means for determining one or more codebook types supported by the UE; means for determining, for each of the one or more codebook types, one or more CSI-RS capabilities associated with multi-TRP CSI measurement; and/or means for transmitting the one or more CSI-RS capabilities for each codebook type.

In some aspects, the UE 120 includes means for determining one or more sets of concurrent codebooks supported by the UE, where a set of concurrent codebooks, included in the one or more set of concurrent codebooks, includes two or more codebooks whose associated CSI-RSs are to be counted towards active CSI-RS resources and CSI-RS ports concurrently in a slot and an indication of whether the set of concurrent codebooks is associated with single TRP communications or multi-TRP communications; and/or means for determining, for each set of concurrent codebooks included in the one or more sets of concurrent codebooks, one or more CSI-RS capabilities associated with multi-TRP CSI measurement. In some aspects, the UE 120 includes means for transmitting an indication of the one or more sets of concurrent codebooks supported by the UE; and/or means for transmitting, for each set of concurrent codebooks included in the one or more sets of concurrent codebooks, an indication of the one or more CSI-RS capabilities.

In some aspects, the UE 120 includes means for determining a set of codebook pairs associated with multi-TRP communications supported by the UE; and/or means for determining, for each codebook pair included in the set of codebook pairs, one or more CSI-RS capabilities associated with multi-TRP CSI measurement. In some aspects, the UE 120 includes means for determining a codebook pair that includes a first codebook to be used by a first TRP associated with a multi-TRP communication and a second codebook to be used by a second TRP associated with the multi-TRP communication. In some aspects, the UE 120 includes means for transmitting an indication of the set of codebook pairs supported by the UE; and/or means for transmitting one or more CSI-RS capabilities, associated with multi-TRP CSI measurement, corresponding to each of the set of codebook pairs supported by the UE.

In some aspects, the UE 120 includes means for determining one or more sets of concurrent codebooks supported by the UE, where a set of concurrent codebooks, included in the one or more set of concurrent codebooks, includes two or more codebooks whose associated CSI-RSs are to be counted towards active CSI-RS resources and CSI-RS ports concurrently in a slot, at least one codebook of the two or more codebooks being a codebook pair, and an indication of whether the set of concurrent codebooks is associated with single TRP communications or multi-TRP communications; and/or means for determining, for each set of concurrent codebooks included in the one or more sets of concurrent codebooks, one or more CSI-RS capabilities associated with multi-TRP CSI measurement. In some aspects, the UE 120 includes means for transmitting an indication of the one or more sets of concurrent codebooks supported by the UE; and/or means for transmitting, for each set of concurrent codebooks included in the one or more sets of concurrent codebooks, an indication of the one or more CSI-RS capabilities.

In some aspects, the UE 120 includes means for determining one or more CSI-RS capabilities, per frequency band supported by the UE, associated with multi-TRP CSI measurement. In some aspects, the UE 120 includes means for determining one or more CSI-RS capabilities, per frequency band combination supported by the UE, associated with multi-TRP CSI measurement.

In some aspects, the UE 120 includes means for receiving a CSI-RS reporting configuration, or a request for multi-TRP CSI measurement that is based at least in part on indication of the one or more CSI-RS capabilities associated with multi-TRP CSI measurement, the CSI-RS reporting configuration, or the request, indicating at least one of: one or more CSI-RS resources, one or more CSI-RS ports, or one or more CSI-RS port groups. In some aspects, the UE 120 includes means for determining a CSI-RS resource and a CSI-RS port is used for multiple multi-TRP CSI hypothesis; and/or means for determining a number of active resource and a number of active port for the CSI-RS resource and the CSI-RS port based on the number of multi-TRP CSI hypothesis.

In some aspects, the UE 120 includes means for transmitting an indication of one or more scaling factors associated with the one or more CSI-RS capabilities (reported as defined, or otherwise fixed, in a wireless communication standard, such as a 3GPP specification, which may indicate the CSI-RS capability for single TRP CSI or multi-TRP CSI, without differentiating between single TRP CSI measurement and multi-TRP CSI measurement), where a scaling factor indicates a number of times that a CSI-RS resource or CSI-RS port are to be counted towards a number of active CSI-RS resources or active CSI-RS ports when used by the UE for multi-TRP CSI measurement. In some aspects, the UE 120 includes means for transmitting an indication of a scaling factor that is to be applied if a CSI-RS resource or CSI-RS port is used for single TRP CSI measurement and multi-TRP CSI measurement. In some aspects, the UE 120 includes means for transmitting an indication of a scaling factor that is to be applied if a CSI-RS resource or CSI-RS port is used for multi-TRP CSI measurement. In some aspects, the UE 120 includes means for transmitting an indication of at least one of: a set of scaling factors per codebook supported by the UE 120, or a set of scaling factors per set of concurrent codebooks supported by the UE 120.

In some aspects, the UE 120 includes means for determining a set of scaling factors for at least one of: each codebook type supported by the UE 120, each set of concurrent codebooks supported by the UE 120, a subset of codebook types from all codebook types supported by the UE 120, or a subset of set of concurrent codebooks from all sets of concurrent codebooks supported by the UE 120, where a number of scaling factors included in the set of scaling factors is equal to a number of CSI-RS capabilities reported by the UE 120; means for determining an order of the set of scaling factors based at least in part on a one-to-one mapping between each scaling factor included in the set of scaling factors and each CSI-RS capability reported by the UE 120; and/or means for transmitting an indication of at least one of: the set of scaling factors per codebook supported by the UE 120, or the set of scaling factors per set of concurrent codebooks supported by the UE 120.

In some aspects, the base station 110 (e.g., a TRP) includes means for receiving, from a UE, an indication of one or more CSI-RS capabilities of the UE associated with multi-TRP CSI measurement, each CSI-RS capability of the UE indicating at least one of a number of active CSI-RS resources or a number of active CSI-RS ports supported by the UE for multi-TRP CSI measurement; and/or means for determining a CSI report configuration, or a request, for multi-TRP CSI measurement associated with the UE based at least in part on the one or more CSI-RS capabilities of the UE. The means for the base station 110 to perform operations described herein may include, for example, transmit processor 220, TX MIMO processor 230, modulator 232, antenna 234, demodulator 232, MIMO detector 236, receive processor 238, controller/processor 240, memory 242, and/or scheduler 246.

In some aspects, the base station 110 includes means for receiving an indication of at least one of: a number of ports per TRP supported by the UE for multi-TRP CSI measurement, a number of multi-TRP CSI hypotheses supported by the UE for multi-TRP CSI measurement, or a total number of ports supported by the UE for multi-TRP CSI measurement.

In some aspects, the base station 110 includes means for receiving an indication of one or more codebook types supported by the UE; and/or means for receiving an indication of one or more CSI-RS capabilities, for each of the one or more codebook types, associated with multi-TRP CSI measurement.

In some aspects, the base station 110 includes means for receiving an indication of one or more sets of concurrent codebooks supported by the UE, where a set of concurrent codebook, included in the one or more sets of concurrent codebooks, includes two or more codebooks and an indication of whether the set of concurrent codebooks is associated with single TRP communications or multi-TRP communications; and/or means for receiving an indication of one or more CSI-RS capabilities of the UE, for each set of concurrent codebooks included in the one or more sets of concurrent codebooks, associated with multi-TRP CSI measurement.

In some aspects, the base station 110 includes means for receiving an indication of a set of codebook pairs associated with multi-TRP communications supported by the UE; and/or means for receiving an indication of one or more CSI-RS capabilities of the UE, for each codebook pair included in the set of codebook pairs, associated with multi-TRP CSI measurement.

In some aspects, the base station 110 includes means for receiving an indication of one or more sets of concurrent codebooks supported by the UE, where a set of concurrent codebooks, included in the one or more set of concurrent codebooks, includes two or more codebooks whose associated CSI-RSs are to be counted towards active CSI-RS resources and CSI-RS ports concurrently in a slot, at least one codebook of the two or more codebooks being a codebook pair, and an indication of whether the set of concurrent codebooks is associated with single TRP communications or multi-TRP communications; and/or means for receiving an indication of one or more CSI-RS capabilities of the UE, associated with multi-TRP CSI measurement, corresponding to the each of one or more sets of concurrent codebooks supported by the UE.

In some aspects, the base station 110 includes means for receiving an indication of one or more CSI-RS capabilities of the UE, per frequency band supported by the UE, associated with multi-TRP CSI measurement. In some aspects, the base station 110 includes means for receiving an indication of one or more CSI-RS capabilities of the UE, per frequency band combination supported by the UE, associated with multi-TRP CSI measurement.

In some aspects, the base station 110 includes means for transmitting, to the UE, the CSI-RS reporting configuration, or the request, for multi-TRP CSI measurement indicating at least one of: one or more CSI-RS resources, one or more CSI-RS ports, or one or more CSI-RS port groups.

In some aspects, the base station 110 includes means for determining a number of CSI-RS resources and a number of CSI-RS ports used by the UE to perform multi-TRP CSI measurements; means for comparing the number of CSI-RS resources and the number of CSI-RS ports to a CSI-RS capability of the UE associated with multi-TRP CSI measurement; and/or means for determining the CSI report configuration or scheduling for multi-TRP CSI measurement associated with the UE based at least in part on comparing the number of CSI-RS resources and the number of CSI-RS ports to the CSI-RS capability of the UE associated with multi-TRP CSI measurement.

In some aspects, the base station 110 includes means for receiving, from the UE, an indication of one or more scaling factors associated with the one or more CSI-RS capabilities of the UE, where a scaling factor indicates a number of times that a CSI-RS resource or CSI-RS port are to be counted towards a number of active CSI-RS resources or active CSI-RS ports when used by the UE for multi-TRP CSI measurement. In some aspects, the base station 110 includes means for receiving, from the UE, an indication of a scaling factor that is to be applied if a CSI-RS resource or CSI-RS port is used by the UE for single TRP CSI measurement and multi-TRP CSI measurement. In some aspects, the base station 110 includes means for receiving, from the UE, an indication of a scaling factor that is to be applied if a CSI-RS resource or CSI-RS port is used by the UE for multi-TRP CSI measurement.

In some aspects, the base station 110 includes means for receiving, from the UE, an indication of at least one of: a set of scaling factors per codebook supported by the UE, or a set of scaling factors per set of concurrent codebooks supported by the UE. In some aspects, the base station 110 includes means for receiving an indication of a scaling factor per CSI-RS capability of the UE.

In some aspects, the base station 110 includes means for determining a number of active CSI-RS resources or active CSI-RS ports associated with the UE, where determining the CSI report configuration for multi-TRP CSI measurement associated with the UE is based at least in part on the number of active CSI-RS resources or active CSI-RS ports associated with the UE.

In some aspects, the base station 110 includes means for determining a number of multi-TRP CSI measurements performed by the UE using a CSI-RS resource; and/or means for determining the number of active CSI-RS resources or active CSI-RS ports based at least in part on the number of multi-TRP CSI measurements performed by the UE using the CSI-RS resource.

In some aspects, the base station 110 includes means for determining a number of multi-TRP CSI measurements performed by the UE using a CSI-RS resource; means for applying a scaling factor, associated with a CSI-RS capability of the UE, to the number of multi-TRP CSI measurements performed by the UE using the CSI-RS resource; and/or means for determining the number of active CSI-RS resources or active CSI-RS ports based at least in part on applying the scaling factor to the number of multi-TRP CSI measurements performed by the UE using the CSI-RS resource.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
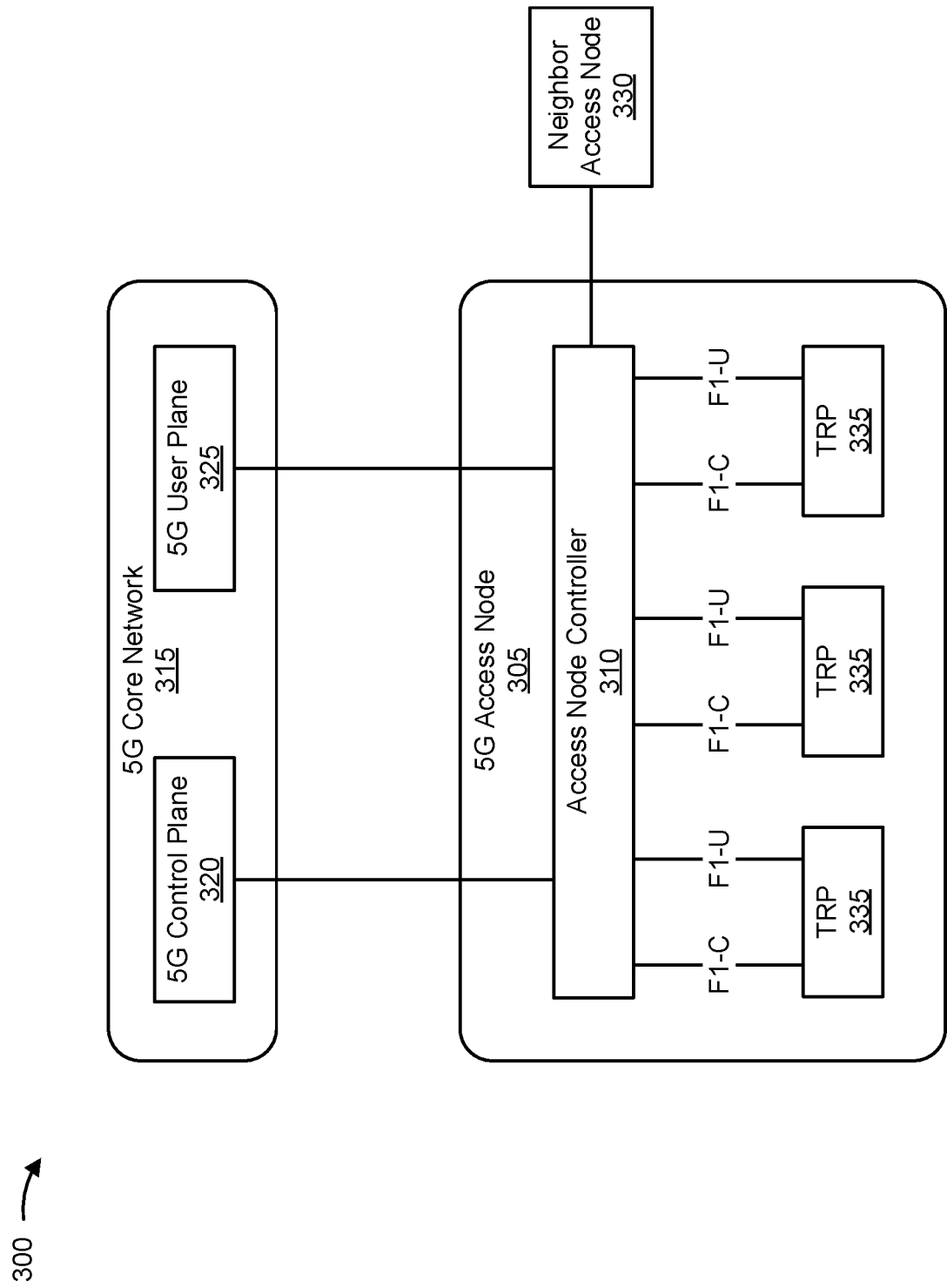
FIG. 3 illustrates an example logical architecture of a distributed radio access network (RAN), according to aspects of the present disclosure.

FIG. 3 illustrates an example logical architecture of a distributed radio access network (RAN) 300, according to aspects of the present disclosure. A 5G access node 305 may include an access node controller 310. The access node controller 310 may be a central unit (CU) of the distributed RAN 300. In some aspects, a backhaul interface to a 5G core network 315 may terminate at the access node controller 310. The 5G core network 315 may include a 5G control plane component 320 and a 5G user plane component 325 (e.g., a 5G gateway), and the backhaul interface for one or both of the 5G control plane and the 5G user plane may terminate at the access node controller 310. Additionally, or alternatively, a backhaul interface to one or more neighbor access nodes 330 (e.g., another 5G access node 305, an LTE access node, and/or the like) may terminate at the access node controller 310.

The access node controller 310 may include and/or may communicate with one or more TRPs 335 (e.g., via an F1 Control (F1-C) interface and/or an F1 User (F1-U) interface). A TRP 335 may be a distributed unit (DU) of the distributed RAN 300. In some aspects, a TRP 335 may correspond to a base station 110 described above in connection with FIG. 1. For example, different TRPs 335 may be included in different base stations 110. Additionally, or alternatively, multiple TRPs 335 may be included in a single base station 110. In some aspects, a base station 110 may include a CU (e.g., access node controller 310) and/or one or more DUs (e.g., one or more TRPs 335). In some cases, a TRP 335 may be referred to as a cell, a panel, an antenna array, an array, and/or the like.

A TRP 335 may be connected to a single access node controller 310 or to multiple access node controllers 310. In some aspects, a dynamic configuration of split logical functions may be present within the architecture of distributed RAN 300. For example, a packet data convergence protocol (PDCP) layer, a radio link control (RLC) layer, a medium access control (MAC) layer, and/or the like may be configured to terminate at the access node controller 310 or at a TRP 335.

In some aspects, multiple TRPs 335 may transmit communications (e.g., the same communication or different communications) in the same transmission time interval (TTI) (e.g., a slot, a mini-slot, a subframe, a symbol, and/or the like) or different TTIs using different quasi co-location (QCL) relationships (e.g., different spatial parameters, different transmission configuration indicator (TCI) states, different precoding parameters, different beamforming parameters, and/or the like). In some aspects, a TCI state may be used to indicate one or more QCL relationships. A TRP 335 may be configured to individually (e.g., using dynamic selection) or jointly (e.g., using joint transmission with one or more other TRPs 335) serve traffic to a UE 120.

As indicated above, FIG. 3 is provided as an example. Other examples may differ from what was described with regard to FIG. 3.

Figure 4:
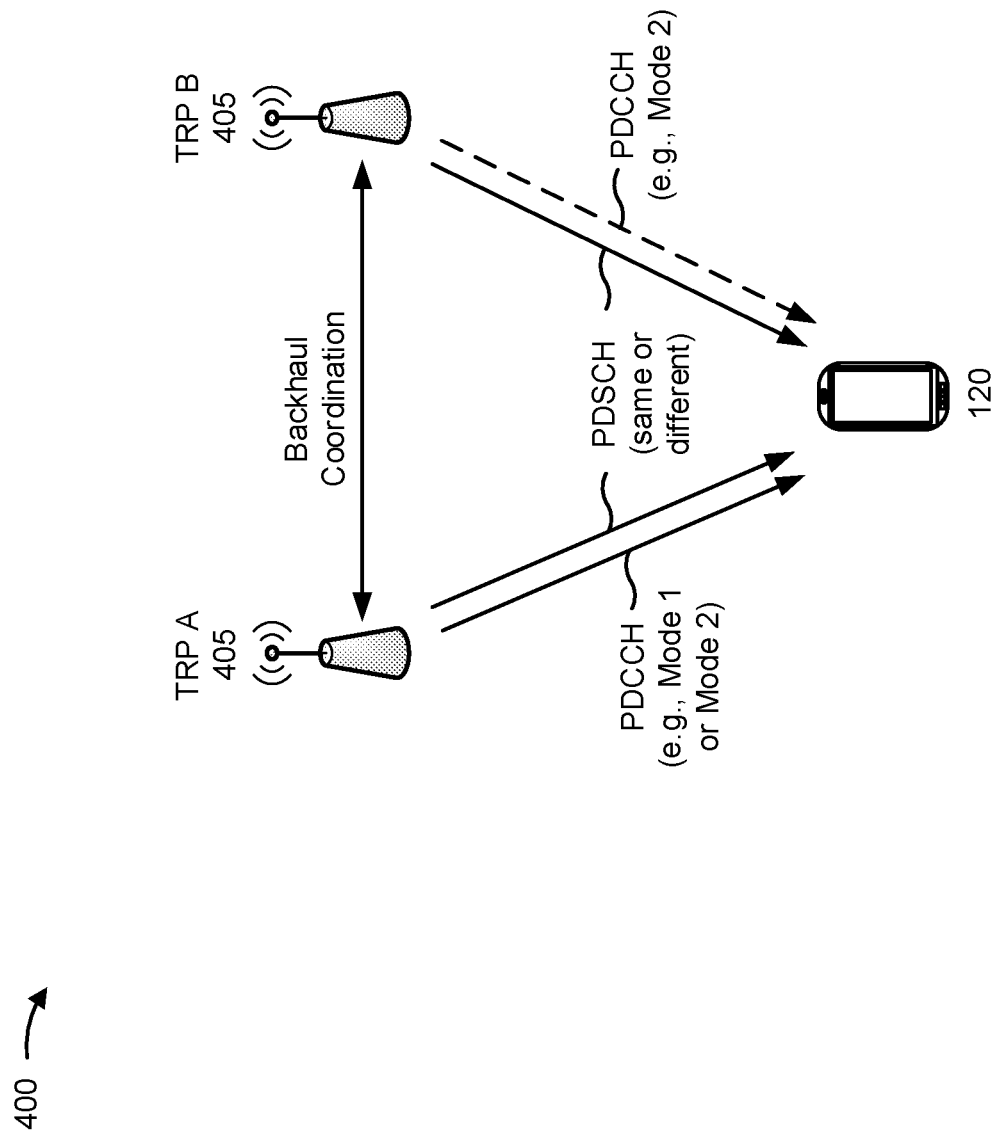
FIG. 4 is a diagram illustrating an example of multiple transmit receive point (multi-TRP) communication, in accordance with various aspects of the present disclosure.

FIG. 4 is a diagram illustrating an example 400 of multi-TRP communication, in accordance with various aspects of the present disclosure. In some aspects, multi- TRP communication may be referred to as multi-panel communication. As shown in FIG. 4, multiple TRPs 405 may communicate with the same UE 120. A TRP 405 may correspond to a TRP 335 described above in connection with FIG. 3.

The multiple TRPs 405 (shown as TRP A and TRP B) may communicate with the same UE 120 in a coordinated manner (e.g., using coordinated multipoint transmissions and/or the like) to improve reliability, increase throughput, and/or the like. The TRPs 405 may coordinate such communications via an interface between the TRPs 405 (e.g., a backhaul interface, an access node controller 310, and/or the like). The interface may have a smaller delay and/or higher capacity when the TRPs 405 are co-located at the same base station 110 (e.g., when the TRPs 405 are different antenna arrays or panels of the same base station 110), and may have a larger delay and/or lower capacity (as compared to co-location) when the TRPs 405 are located at different base stations 110. The different TRPs 405 may communicate with the UE 120 using different QCL relationships (e.g., different TCI states), different demodulation reference signal (DMRS) ports, different layers (e.g., of a multi-layer communication), and/or the like.

In a first multi-TRP transmission mode (e.g., Mode 1), a single physical downlink control channel (PDCCH) may be used to schedule downlink data communications for a single physical downlink shared channel (PDSCH). In this case, multiple TRPs 405 (e.g., TRP A and TRP B) may transmit communications to the UE 120 on the same PDSCH. For example, a communication may be transmitted using a single codeword with different spatial layers for different TRPs 405 (e.g., where one codeword maps to a first set of layers transmitted by a first TRP 405 and maps to a second set of layers transmitted by a second TRP 405). As another example, a communication may be transmitted using multiple codewords, where different codewords are transmitted by different TRPs 405 (e.g., using different sets of layers). In either case, different TRPs 405 may use different QCL relationships (e.g., different TCI states) for different DMRS ports corresponding to different layers. For example, a first TRP 405 may use a first QCL relationship or a first TCI state for a first set of DMRS ports corresponding to a first set of layers, and a second TRP 405 may use a second (different) QCL relationship or a second (different) TCI state for a second (different) set of DMRS ports corresponding to a second (different) set of layers. In some aspects, a TCI state in downlink control information (DCI) (e.g., transmitted on the PDCCH, such as DCI format 1_0, DCI format 1_1, and/or the like) may indicate the first QCL relationship (e.g., by indicating a first TCI state) and the second QCL relationship (e.g., by indicating a second TCI state). The first and the second TCI states may be indicated using a TCI field in the DCI. In general, the TCI field can indicate a single TCI state (for single-TRP transmission) or multiple TCI states (for multi-TRP transmission as discussed here) in this multi-TRP transmission mode (e.g., Mode 1).

In some aspects, the first multi-TRP transmission mode (e.g., Mode 1) may be associated with a spatial division multiplexing (SDM) configuration, a single frequency network (SFN) configuration, a frequency division multiplexing (FDM) configuration, or a time division multiplexing (TDM) configuration. An SDM configuration may also be referred to as a non-coherent joint transmission (NCJT) configuration. In an SDM configuration, a first set of layers may be transmitted by the first TRP 405, and a second set of layers may be transmitted by the second TRP 405. The first set of layers and the second set of layers may be associated with the same frequency domain resource allocation and the same time domain resource allocation. The UE 120 may calculate two precoder matrix indicators (PMIs) (e.g., one PMI for the first TRP 405 and one PMI for the second TRP 405) assuming the first set of layers and the second set of layers may be associated with the same frequency domain resource allocation and the same time domain resource allocation. In an SDM configuration, the PDSCH transmitted by the first TRP 405, and the PDSCH transmitted by the second TRP 405 may be associated with the same frequency domain resource allocation and the same time domain resource allocation. In an SFN configuration, the UE 120 may calculate two PMIs (e.g., one PMI for the first TRP 405 and one PMI for the second TRP 405) assuming that the same layers are transmitted by the first TRP 405 and the second TRP 405 using the same frequency domain resource allocation and the same time domain resource allocation.

In an FDM configuration, the PDSCH (e.g., one or more layers) transmitted by the first TRP 405 and the PDSCH transmitted by the second TRP 405 may be associated with the same rank and/or codeword but a different frequency domain resource allocation (e.g., and the same time domain resource allocation). The UE 120 may calculate two PMIs (e.g., one PMI for the first TRP 405 and one PMI for the second TRP 405) assuming that the same layers are transmitted by the first TRP 405 and the second TRP 405 using different frequency domain resources and the same time domain resources. In a TDM configuration, the PDSCH transmitted by the first TRP 405 and the PDSCH transmitted by the second TRP 405 may be associated with the same rank and/or codeword but a different time domain resource allocation (e.g., and the same frequency domain resource allocation). The UE 120 may calculate two PMIs (e.g., one PMI for the first TRP 405 and one PMI for the second TRP 405) assuming that the same layers are transmitted by the first TRP 405 and the second TRP 405 using the same frequency domain resources and different time domain resources.

In a second multi-TRP transmission mode (e.g., Mode 2), multiple PDCCHs may be used to schedule downlink data communications for multiple corresponding PDSCHs (e.g., one PDCCH for each PDSCH). In this case, a first PDCCH may schedule a first codeword to be transmitted by a first TRP 405, and a second PDCCH may schedule a second codeword to be transmitted by a second TRP 405. Furthermore, first DCI (e.g., transmitted by the first TRP 405) may schedule a first PDSCH communication associated with a first set of DMRS ports with a first QCL relationship (e.g., indicated by a first TCI state) for the first TRP 405, and second DCI (e.g., transmitted by the second TRP 405) may schedule a second PDSCH communication associated with a second set of DMRS ports with a second QCL relationship (e.g., indicated by a second TCI state) for the second TRP 405. In this case, DCI (e.g., having DCI format 1_0, DCI format 1_1, and/or the like) may indicate a corresponding TCI state for a TRP 405 corresponding to the DCI. The TCI field of a DCI indicates the corresponding TCI state (e.g., the TCI field of the first DCI indicates the first TCI state and the TCI field of the second DCI indicates the second TCI state). In the second multi-TRP transmission mode (e.g., Mode 2), the PDSCH transmitted by the first TRP 405, and the PDSCH transmitted by the second TRP 405 may have resource allocations (e.g., frequency domain resource allocations and/or time domain resource allocations) that are fully overlapping (e.g., the same), partially overlapping, or not overlapping.

As indicated above, FIG. 4 is provided as an example. Other examples may differ from what is described with respect to FIG. 4.

Figure 5:
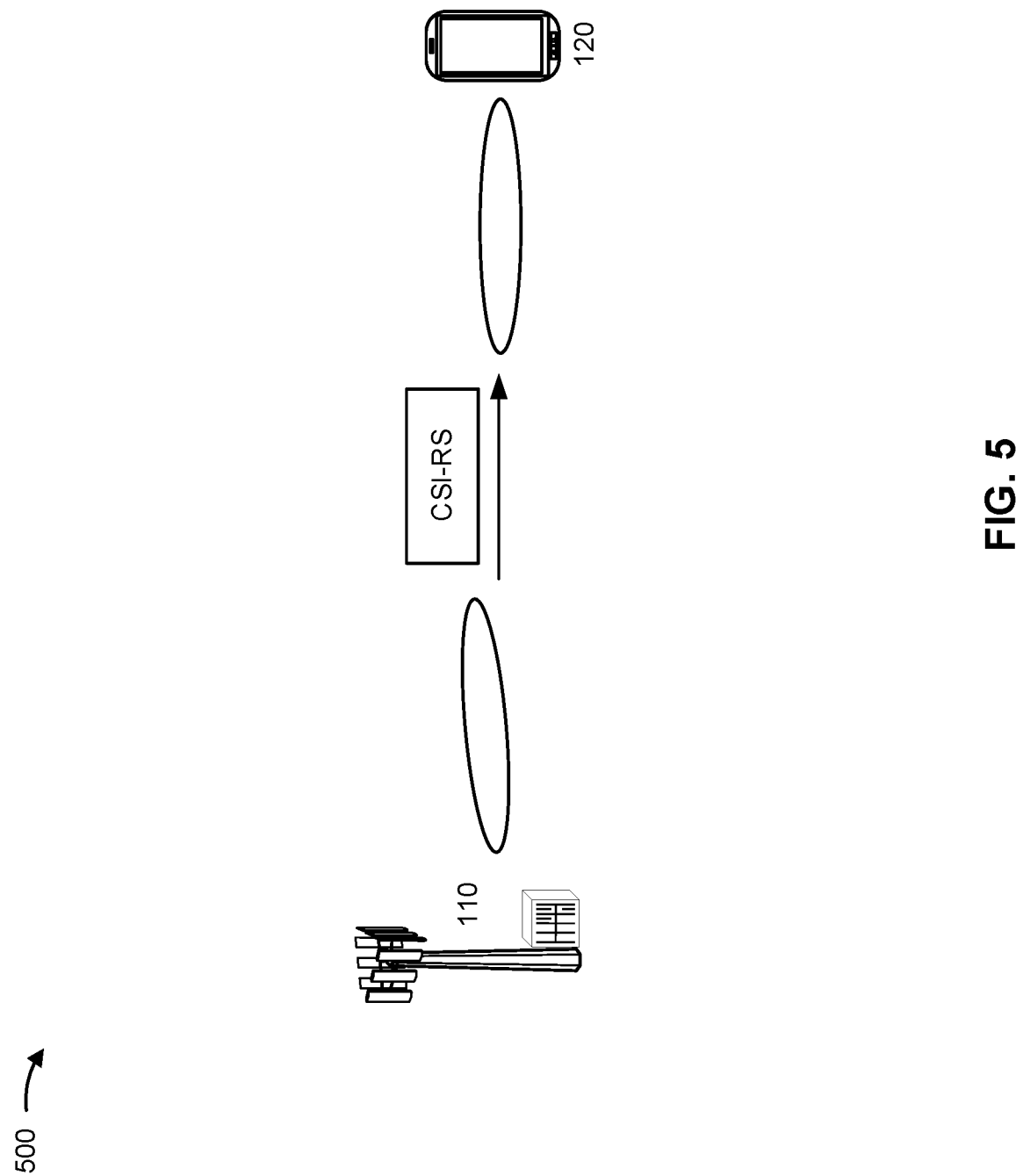
FIG. 5 is a diagram illustrating examples of channel state information (CSI) reference signal (CSI-RS) beam management procedures, in accordance with various aspects of the present disclosure.

FIG. 5 is a diagram illustrating examples 500, 510, and 520 of CSI-RS beam management report procedures, in accordance with various aspects of the present disclosure. As shown in FIG. 5, examples 500, 510, and 520 include a UE 120 in communication with a base station 110 in a wireless network (e.g., wireless network 100). However, the devices shown in FIG. 5 are provided as examples, and the wireless network may support communication and beam management between other devices (e.g., between a UE 120 and a base station 110 or transmit receive point (TRP), between a mobile termination node and a control node, between an integrated access and backhaul (IAB) child node and an IAB parent node, between a scheduled node and a scheduling node, and/or the like). In some aspects, the UE 120 and the base station 110 may be in a connected state (e.g., a radio resource control (RRC) connected state and/or the like).

As shown in FIG. 5, example 500 may include the base station 110 transmitting one or more CSI-RSs to the UE 120. a CSI-RS may be used for downlink channel measurement (e.g., downlink CSI acquisition), which may be used for scheduling, link adaptation, or beam management, among other examples. The base station 110 may configure a set of CSI-RSs for the UE 120, and the UE 120 may measure the configured set of CSI-RSs. Based at least in part on the measurements, the UE 120 may perform CSI measurement and may report CSI parameters to the base station 110 (e.g., in a CSI report), such as a channel quality indicator (CQI), a PMI, a CSI-RS resource indicator (CRI), a layer indicator (LI), a rank indicator (RI), or a reference signal received power (RSRP), among other examples. The base station 110 may use the CSI report to select transmission parameters for downlink communications to the UE 120, such as a number of transmission layers (e.g., a rank), a precoding matrix (e.g., a precoder), a modulation and coding scheme (MCS), or a refined downlink beam (e.g., using a beam refinement procedure or a beam management procedure), among other examples.

In some aspects, a UE 120 may be configured with a set of CSI-RS resources for performing CSI measurement for single TRP and/or for multi-TRP (e.g., the same set of CSI-RS resources may be used for single TRP CSI measurement and for multi-TRP CSI measurement). For example, a CSI-RS report configuration may be associated with a first CSI-RS resource and a second CSI-RS resource (in some aspects, this CSI-RS report configuration may be referred to as a category 1.1 CSI-RS configuration). The first CSI-RS resource may be configured with a first TCI state and associated with a first TRP, and the second CSI-RS resource may be configured with a second TCI state and associated with a second TRP. The UE 120 may use the first CSI-RS resource for performing single TRP CSI measurement associated with the first TRP and/or may use the second CSI-RS resource for performing single TRP CSI measurement associated with the second TRP. Additionally, or alternatively, the UE 120 may use both the first CSI-RS resource and the second CSI-RS resource for performing multi-TRP CSI measurement associated with multi-TRP transmissions from the first TRP and the second TRP.

In some aspects, a CSI-RS report configuration may be associated with a CSI-RS resource comprising a first port group and a second port group (in some aspects, this CSI-RS report configuration may be referred to as a category 1.2 CSI-RS configuration). The first port group may be associated with a first TRP and the second port group may be associated with a second TRP. The CSI-RS resource may be associated with two TCI states (e.g., a first TCI state associated with the first TRP and a second TCI state associated with the second TRP). The UE 120 may use the CSI-RS resource, the first port group, and the first TCI state for performing single TRP CSI measurement associated with the first TRP. Similarly, the UE 120 may use the CSI-RS resource, the second port group, and the second TCI state for performing single TRP CSI measurement associated with the first TRP. Additionally, or alternatively, the UE 120 may use the CSI-RS resource, both the first port group and the second port group, and both the first TCI state and the second TCI state for performing multi-TRP CSI measurement associated with multi-TRP transmissions from the first TRP and the second TRP.

In some aspects, the UE 120 may be configured with a first CSI-RS report configuration (e.g., by a first TRP) and a second CSI-RS report configuration (e.g., by a second TRP), where the first CSI-RS report configuration and the second CSI-RS report configuration are associated with each other (e.g., the first CSI-RS report configuration and/or the second CSI-RS report configuration may include a reference to the other CSI-RS report configuration). In some aspects, this CSI-RS report configuration may be referred to as a category 2 CSI-RS configuration. The first CSI-RS report configuration may indicate a first CSI-RS resource associated with the first TRP (e.g., and a first TCI state). The second CSI-RS report configuration may indicate a second CSI-RS resource associated with the second TRP (e.g., and a second TCI state). The UE 120 may use the first CSI-RS resource for performing single TRP CSI measurement associated with the first TRP and/or may use the second CSI-RS resource for performing single TRP CSI measurement associated with the second TRP. Additionally, or alternatively, the UE 120 may use both the first CSI-RS resource and the second CSI-RS resource for performing multi-TRP CSI measurement associated with multi-TRP transmissions from the first TRP and the second TRP.

In some aspects, a UE 120 may report a CSI-RS capability that indicates a number of active CSI-RS ports and a number of active CSI-RS resources that can be supported by the UE 120. An active CSI-RS resource and/or an active CSI-RS port may indicate that the CSI-RS resource and/or CSI-RS port is indicated in an active CSI-RS configuration or scheduling (e.g., and may be used by the UE 120 to perform CSI measurement). In any slot, the UE is not expected to have more active CSI-RS ports or active CSI-RS resources than the reported capability. For an aperiodic CSI-RS, associated CSI-RS resources and CSI-RS ports may be considered active starting from the end of a PDCCH communication that includes the request for a CSI report from the UE 120 and ending at the end of a physical uplink shared channel (PUSCH) communication that includes the CSI report associated with the aperiodic CSI-RS. For a semi-persistent CSI-RS, associated CSI-RS resources and CSI-RS ports may be considered active starting from the end of an activation command (e.g., from the end of a MAC-CE communication activating a semi-persistent CSI-RS) and ending at the end of a deactivation command (e.g., at the end of a MAC-CE communication deactivating the semi-persistent CSI-RS). For a periodic CSI-RS, associated CSI-RS resources and CSI-RS ports may be considered active starting from a time at which the periodic CSI-RS is configured (e.g., by higher layer signaling, such as RRC signaling) and ending at a time at which the configuration associated with the periodic CSI-RS is released.

A UE 120 may report a CSI-RS capability of the UE 120 by transmitting an indication of a number of CSI-RS ports per resource supported by the UE 120, a number of CSI-RS resources supported by the UE 120, and/or a total number of CSI-RS ports supported by the UE 120. The UE 120 may report a list of CSI-RS capabilities per codebook type supported by the UE 120 and/or per concurrent codebook combination supported by the UE 120. A concurrent codebook combination may refer to multiple codebook types that have active CSI-RS resources and ports within a time slot (e.g., whose associated CSI-RSs are to be counted towards active CSI-RS resources and CSI-RS ports concurrently in the same slot). Additionally, the UE 120 may report CSI-RS capabilities for each codebook type and/or for each concurrent codebook combination per frequency band supported by the UE 120 and per frequency band combination supported by the UE 120. For example, codebook types may include The codebook types may include a Type I—single panel codebook, a Type I—multi-panel codebook, a Type II codebook, a Type II—port-selection codebook, an eType II codebook, and/or an eType II port-selection codebook. A concurrent codebook combination may include {Type I—single panel codebook and Type II}, {Type I—single panel codebook and Type II—port-selection}, {type I—single panel codebook, eType II R=1}, {type I—single panel codebook, eType II port-selection R=1}, {type I—single panel codebook, eType II R=2}, {type I—single panel codebook, eType II port-selection R=2} and/or {type I—single panel codebook, type II, and type II port-selection}, {Type I—multi-panel codebook and Type II}, {Type I—multi-panel codebook and Type II—port-selection}, {type I—multi-panel codebook, eType II R=1}, {type I—multi-panel codebook, eType II port-selection R=1}, {type I—multi-panel codebook, eType II R=2}, {type I—multi-panel codebook, eType II port-selection R=2} and/or {type I—multi-panel codebook, type II, and type II port-selection}, among other examples, where R is the number of PMIs per subband.

The network (e.g., a base station 110 and/or a TRP, among other examples) may determine active CSI-RS resources and/or active CSI-RS ports for a UE 120 on a per-resource basis (e.g., the number of active CSI-RS resources and/or active CSI-RS ports may be determined by the network by determining the number of times a CSI-RS resource is indicated as active). However, in some aspects, as described above, a CSI-RS resource may be used multiple times (e.g., once for single TRP CSI measurement and once for multi-TRP CSI measurement). For example, for SDM multi-TRP CSI measurement, a single CSI-RS resource may be used by the UE 120 multiple times, but the single CSI-RS resource may be counted as active only once by the network. As a result, the network may attempt to configure the UE 120 with a CSI report configuration that exceeds the CSI-RS capability of the UE 120.

Moreover, multi-TRP CSI measurement involves greater complexity than single TRP CSI measurement. Therefore, counting a CSI-RS resource on a per-use basis (e.g., counting a CSI-RS resource once each time it is used) may be insufficient to determine if the CSI-RS capability of the UE 120 is met. For example, a single use of a CSI-RS resource for single TRP CSI measurement may not be equivalent to a single use of a CSI-RS resource for multi-TRP CSI measurement (e.g., due to the additional complexity associated with multi-TRP CSI measurement). As a result, counting a CSI-RS resource used for multi-TRP CSI measurement in the same manner as a CSI-RS resource used for single-TRP CSI measurement may be insufficient.

Some techniques and apparatuses described herein enable CSI-RS capability reporting for multi-TRP CSI measurement. For example, a UE 120 may report a CSI-RS capability for multi-TRP CSI measurement. The UE 120 may report a list of CSI-RS capabilities per codebook type supported by the UE 120, per concurrent codebook combination supported by the UE 120, per codebook pairs supported by the UE 120 (a codebook pair may refer to a scenario in which two TRPs use different codebook types), per concurrent codebook pairs supported by the UE 120, per frequency band, and/or per frequency band combination. Additionally, or alternatively, the UE 120 may report a scaling factor that indicates a number of times a CSI-RS resource and/or CSI-RS port is to be counted towards the number of active CSI-RS resources and/or active CSI-RS ports associated with the UE 120. As a result, the network may be enabled to more accurately determine a UE 120 capability for multi-TRP CSI measurement. Therefore, the network may not configure the UE 120 with a CSI-RS report configuration that exceeds the UE 120 capability. This may improve efficiency associated with multi-TRP CSI measurement as the UE 120 may not be configured with a CSI report configuration that exceeds the capability of the UE 120.

Figure 6:
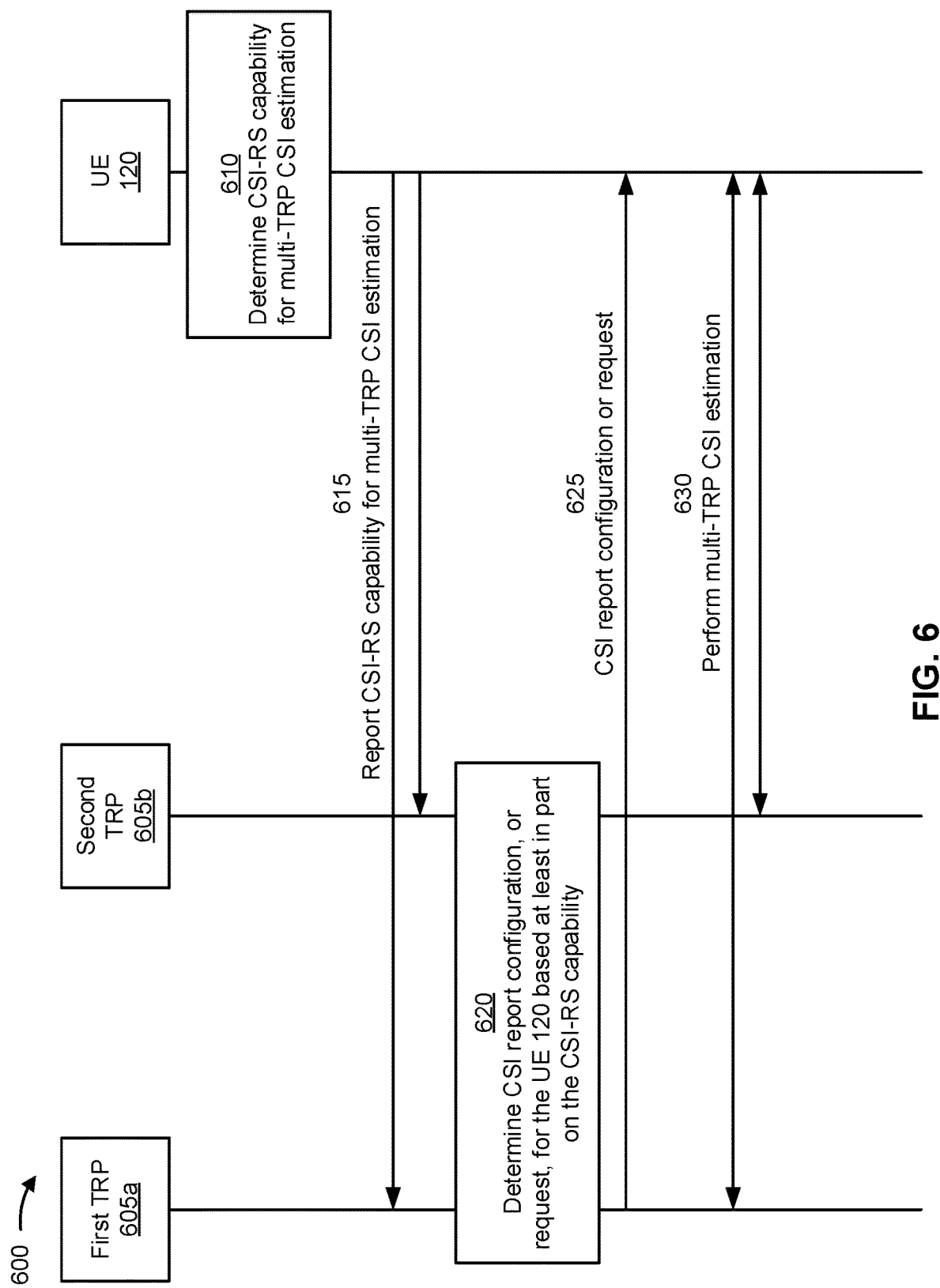
FIG. 6 is a diagram illustrating an example associated with CSI-RS capability reporting for multi-TRP CSI measurement, in accordance with various aspects of the present disclosure.

FIG. 6 is a diagram illustrating an example 600 associated with CSI-RS capability reporting for multi-TRP CSI measurement, in accordance with various aspects of the present disclosure. As shown in FIG. 6, a UE 120 may communicate with one or more TRPs, such as a first TRP 605*a* and a second TRP 605*b*. The first TRP 605*a* may be associated with a first base station 110, and the second TRP 605*b* may be associated with a second base station 110. In some aspects, the first TRP 605*a* and the second TRP 605*b* may be associated with the same base station 110.

As show by reference number 610, the UE 120 may determine one or more CSI-RS capabilities associated with multi-TRP CSI measurement. For example, the UE 120 may determine at least one of a number of active CSI-RS resources or a number of active CSI-RS ports supported by the UE 120 for multi-TRP CSI measurement. In some aspects, the UE 120 may determine a number of CSI-RS ports per TRP supported by the UE 120, a number of multi-TRP CSI measurements supported by the UE 120 (e.g., a number of SDM multi-TRP CSI measurements supported by the UE 120), and/or a number of total CSI-RS ports supported by the UE 120, among other examples.

In some aspects, the UE 120 may determine a number of CSI-RS ports per CSI-RS resource supported, a number of CSI-RS resources and a total number of ports supported for multi-TRP CSI measurement. For example, where a CSI-RS report configuration indicates multiple CSI-RS resources for multiple TRPs (e.g., for a category 1.1 CSI-RS configuration, described above), the UE 120 may determine a number of ports per resource, and a number of CSI-RS resources supported for multi-TRP CSI measurement, where the number of CSI-RS resources is a function of two, such as two CSI-RS resources, four CSI-RS resources, six CSI-RS resources, and so on. In some aspects, the UE 120 may determine a number of CSI-RS resource pairs supported for multi-TRP CSI measurement and a number of ports supported across all resources. In some aspects, where a CSI-RS report configuration indicates a single CSI-RS resource that is associated with multiple TCI states (e.g., for a category 1.2 CSI-RS configuration, described above), the UE 120 may determine a number of CSI-RS ports per port group supported for multi-TRP CSI measurement (or a number, P, of CSI-RS ports per CSI-RS resource supported. In that case, the UE 120 may support up to P/2 per port-group. The UE 120 may support any combination of P1 ports in a first port-group and P2 ports in a second port-group, such that P1+P2<=P ports), a number of CSI-RS resources, and a number of total ports supported by the UE 120 for multi-TRP CSI measurement.

In some aspects, the UE 120 may determine a list of CSI-RS capabilities for multi-TRP CSI measurement per codebook type supported by the UE 120 (e.g., a list of CSI-RS capabilities for each codebook type). As used herein, a list of CSI-RS capabilities may include one or more CSI-RS capabilities of the UE 120. For example, the UE 120 may support multiple codebook types. The codebook types may be defined, or otherwise fixed, by a wireless communication standard, such as a 3GPP standard. The codebook types may include a Type I—single panel codebook, a Type I-multi-panel codebook, a Type II codebook, a Type II—port-selection codebook, an eType II codebook, and/or an eType II port-selection codebook, among other examples. The UE 120 may determine one or more CSI-RS capabilities for multi-TRP CSI measurement for each codebook type supported by the UE 120. In some aspects, the UE 120 may determine, for each list of CSI-RS capabilities associated with supported codebook types, a list CSI-RS capabilities per frequency band supported by the UE 120 and/or per frequency band combination supported by the UE 120. The list of capabilities may comprise 7 triplets of {P,K,Ptot}, where, for a category 1.1 CSI-RS configuration, P is a maximum number of ports per resource supported, K is a maximum number of CSI-RS resources or CSI-RS resource pairs supported, and Ptot a maximum number of ports across all CSI-RS resources or CSI-RS resource pairs supported. For a category 1.2 CSI-RS configuration, P is a maximum number of ports per port-group or CSI-RS resource supported, K is a maximum number of CSI-RS resources supported, and Ptot is a maximum number of ports across all resources supported. The 7 triplets may differ by the value of P (i.e., P=2,4,8,12,16,24, and/or 32), and for each P, the corresponding K and Ptot may be different. This is because the CSI measurement complexity may be different for different values of P.

In some aspects, the UE 120 may determine a list of one or more codebook pairs supported by the UE 120. A codebook pair may refer to a scenario in which a first TRP (such as the first TRP 605*a*) and a second TRP (such as the second TRP 605*b*) use different codebooks for a multi-TRP communication with the UE 120. The codebook pair may include a first codebook used by the first TRP and a second codebook used by the second TRP. The UE 120 may determine one or more codebook pairs supported by the UE 120.

The UE 120 may determine a list of CSI-RS capabilities for each codebook pair included in the list of the one or more codebook pairs supported by the UE 120. For example, the UE 120 may determine values for a triplet {P,K,Ptot} supported by the UE 120 for multi-TRP CSI measurement for each codebook pair. In other words, if a codebook pair includes a first codebook and a second codebook, the UE 120 may determine a list of CSI-RS capabilities of the UE 120 if the first codebook and the second codebook are used by a first TRP and a second TRP associated with multi-TRP CSI measurement (e.g., a number of CSI-RS ports supported by the UE 120 across the first codebook and the second codebook, a number of CSI-RS resources or resource pairs supported by the UE 120 across the first codebook and the second codebook, and/or a number of total CSI-RS ports supported by the UE 120). The UE 120 may determine, each codebook pair, a list CSI-RS capabilities per frequency band supported by the UE 120 and/or per frequency band combination supported by the UE 120. The UE 120 may report the supported list of codebook pairs and the supported list CSI-RS capabilities for each codebook pair, as described in more detail below.

In some aspects, the UE 120 may determine a list of one or more sets of concurrent codebooks supported by the UE 120. A set of concurrent codebooks may include multiple codebook types that may be used by the UE 120 within a period of time (e.g., within a time slot). That is, concurrent codebooks may be two or more codebooks whose associated CSI-RSs are to be counted towards active CSI-RS resources and CSI-RS ports concurrently in a slot (e.g., the same slot). For example, a set of concurrent codebooks may include a first codebook type and a second codebook type. Another set of concurrent codebooks may include a first codebook type, a second codebook type, and a third codebook type. In some aspects, a set of concurrent codebooks may include an indication of codebook types and whether the codebook type is associated with single TRP CSI measurement or multi-TRP CSI measurement. For example, a set of concurrent codebooks may include codebook 1 and codebook 2. Each codebook (e.g., codebook 1 and/or codebook 2) may indicate a codebook type associated with the codebook and whether the codebook is associated with single TRP CSI measurement or multi-TRP CSI measurement. For example, a set of concurrent codebooks may include {codebook 1 and codebook 2}, {codebook 2 and codebook 3}, and/or {codebook 1, codebook 2, and codebook 3}, among other examples. Codebook 1 may be a Type I single panel codebook and may be associated with multi-TRP CSI measurement, codebook 2 may be a Type II codebook and may be associated with single TRP CSI measurement, and codebook 3 may be a Type I codebook and may be associated with single TRP CSI measurement, among other examples.

In some aspects, a codebook included in a set of concurrent codebooks may be a codebook pair, as described above. For example, a set of concurrent codebooks may include a first codebook type and a second codebook type. The first codebook type may be a codebook pair (e.g., two codebook types used by two TRPs for multi-TRP communications) and the second codebook may be a second codebook type (e.g., used for single TRP and/or multi-TRP). For example, a set of concurrent codebooks may include {codebook 1 and codebook 2}, {codebook 2 and codebook 3}, and/or {codebook 1, codebook 2, and codebook 3}, among other examples. Codebook 1 may be a codebook pair that includes a codebook type 1 and a codebook type 2 and is associated with multi-TRP CSI measurement, codebook 2 may be a Type II codebook and may be associated with single TRP CSI measurement, and codebook 3 may be a Type II codebook and may be associated with multi-TRP CSI measurement.

The UE 120 may determine a list of CSI-RS capabilities for each set of concurrent codebooks included in the list of one or more sets of concurrent codebooks supported by the UE 120. For example, the UE 120 may determine a number of active CSI-RS resources or a number of active CSI-RS ports supported by the UE 120 for multi-TRP CSI measurement for each set of concurrent codebooks. In other words, if a set of concurrent codebooks includes a first codebook and a second codebook, the UE 120 may determine a list of CSI-RS capabilities of the UE 120 if the first codebook and the second codebook are used by the UE 120 concurrently (e.g., a number of CSI-RS ports supported by the UE 120 across the first codebook and the second codebook, a number of CSI-RS resources supported by the UE 120 across the first codebook and the second codebook, and/or a number of total CSI-RS ports supported by the UE 120). The UE 120 may determine and report, for a list of CSI-RS capabilities associated with a set of concurrent codebooks. The UE 120 may determine a list of CSI-RS capabilities for each set of concurrent codebooks per frequency band supported by the UE 120. In some aspects, the UE 120 may determine a list of CSI-RS capabilities for each set of concurrent codebooks per frequency band combination supported by the UE 120.

In some aspects, for a list CSI-RS capabilities (e.g., any one of the lists of CSI-RS capabilities described herein, such as a list of CSI-RS capabilities per codebook type, a list of CSI-RS capabilities per codebook pair, and/or a list of CSI-RS capabilities per set of concurrent codebooks, among other examples), the UE 120 may determine a list of CSI-RS capabilities associated with an SDM multi-TRP configuration, an SFN multi-TRP configuration, an FDM multi-TRP configuration, and/or a TDM multi-TRP configuration. That is, the UE 120 may determine a list of CSI-RS capabilities for SDM multi-TRP configurations, FDM multi-TRP configurations, and/or TDM multi-TRP configurations separately.

In some aspects, the UE 120 may determine one or more scaling factors associated with a CSI-RS capability. The scaling factor may indicate a number of times that a CSI-RS resource or CSI-RS port are to be counted (e.g., by the network) towards a number of active CSI-RS resources or active CSI-RS ports when used by the UE 120 for multi-TRP CSI measurement. For example, a scaling factor of N may indicate that CSI-RS resources and/or CSI-RS ports corresponding to the CSI-RS capability associated with the scaling factor are to be counted N times. In some aspects, the UE 120 may determine an report one or more scaling factors associated with a CSI-RS capability to indicate a multi-TRP CSI capability (e.g., rather than determining and reporting a different multi-TRP CSI capability, as described above). The CSI-RS capability associated with one or more scaling factors may be defined, or otherwise fixed, by a wireless communication standard, such as a 3GPP specification. In other words, the CSI-RS capability associated with one or more scaling factors may apply to both single TRP CSI measurement and multi-TRP CSI measurement (e.g., the CSI-RS capability may not differentiate between single TRP CSI measurement and multi-TRP CSI measurement). For example, the UE 120 may determine and report a list of CSI-RS capabilities for each codebook type and/or set of concurrent codebooks supported by the UE 120. The UE 120 may determine one or more scaling factors associated with each reported CSI-RS capability (e.g., with a one-to-one mapping between a list of scaling factors reported and a list of single TRP CSI-RS capabilities of the UE 120.

In some aspects, the scaling factor may be associated with a CSI-RS resource and/or CSI-RS port that is used for both single TRP CSI measurement and multi-TRP CSI measurement. That is, the scaling factor may indicate a value N that is to be applied if CSI-RS resources and/or CSI-RS ports corresponding to the CSI-RS capability associated with the scaling factor are used for both single TRP CSI measurement and multi-TRP CSI measurement (the resource and ports are to be counted N times if used for single and multi-TRP CSI measurement). In some aspects, the scaling factor may be associated with a CSI-RS resource and/or CSI-RS port that is multi-TRP CSI measurement. That is, the scaling factor may indicate a value N that is to be applied if CSI-RS resources and/or CSI-RS ports corresponding to the CSI-RS capability associated with the scaling factor are used for multi-TRP CSI measurement (the resource and ports are to be counted N times if used for multi-TRP CSI measurement in addition to single-TRP CSI measurement). Moreover, if a CSI-RS resource and CSI-RS ports within the resource are used for M multi-TRP CSI measurement, the CSI-RS resource and CSI-RS ports may be counted N*M times (e.g., towards a number of active CSI-RS resources and active CSI-RS ports associated with the UE 120).

As shown by reference number 615, the UE 120 may transmit an indication of one or more CSI-RS capabilities associated with multi-TRP CSI measurement. For example, the UE 120 may transmit a report indicating one or more CSI-RS capabilities (e.g., each CSI-RS capability indicating a number of active CSI-RS ports supported by the UE 120, a number of active CSI-RS resources supported by the UE 120, and/or a number of total CSI-RS ports supported by the UE 120) for each codebook type supported by the UE 120. The UE 120 may transmit a report indicating a list of CSI-RS capabilities for each codebook pair supported by the UE 120. The UE 120 may transmit a report indicating a list of CSI-RS capabilities for each set of concurrent codebooks supported by the UE 120. In some aspects, the UE 120 may transmit an indication of the list of the one or more codebook pairs supported by the UE 120 and/or a list of the one or more sets of concurrent codebooks supported by the UE 120.

For any list of CSI-RS capabilities, the UE 120 may report the list CSI-RS capabilities per frequency band and/or per frequency band combination (e.g., a list of CSI-RS capabilities may indicate different capabilities for different frequency band and/or different frequency band combinations). Similarly, for any list of CSI-RS capabilities, the UE 120 may report the list of CSI-RS capabilities for SDM multi-TRP configurations, FDM multi-TRP configurations, and/or TDM multi-TRP configurations (e.g., a list of CSI-RS capabilities may indicate different capabilities for different multi-TRP configurations).

In some aspects, the UE 120 may transmit an indication of a set of one or more scaling factors associated with the one or more CSI-RS capabilities. For example, if the UE 120 transmits one or more CSI-RS capabilities associated with one or more codebook types, the UE 120 may transmit a set of scaling factors that correspond to the set of CSI-RS capabilities (e.g., a first CSI-RS capability included in the one or more CSI-RS capabilities may correspond to a first scaling factor included in the one or more scaling factors).

As shown by reference number 620, the first TRP 605*a* and/or the second TRP 605*b* may determine a CSI report configuration or request/scheduling for multi-TRP CSI measurement associated with the UE 120 based at least in part on a CSI-RS capability reported by the UE 120. For example, the first TRP 605*a* and/or the second TRP 605*b* may determine an applicable CSI-RS capability of the UE 120 for multi-TRP CSI measurement (e.g., based at least in part on a codebook type associated with the multi-TRP CSI measurement, a codebook pair associated with the multi-TRP CSI measurement, a set of concurrent codebooks associated with the multi-TRP CSI measurement, a set of concurrent codebooks pairs associated with the multi-TRP CSI measurement, a multi-TRP configuration (e.g., SDM, FDM, or TDM) associated with the multi-TRP CSI measurement, a frequency band associated with the multi-TRP CSI measurement, and/or a frequency band combination associated with the multi-TRP CSI measurement, among other examples).

The first TRP 605*a* and/or the second TRP 605*b* may determine a number of active CSI-RS resources and/or a number of active CSI-RS ports associated with the UE 120. For example, the first TRP 605*a* and/or the second TRP 605*b* may determine a number of CSI measurements performed by the UE 120 within a period of time (e.g., a time slot). The first TRP 605*a* and/or the second TRP 605*b* may count a CSI-RS resource and/or a CSI-RS port used for multi-TRP CSI measurement towards a number of active CSI-RS resources and/or a number of active CSI-RS ports based at least in part on the number of multi-TRP CSI measurements performed by the UE 120 using the CSI-RS resource and/or a CSI-RS port (e.g., rather than the number of CSI report configurations indicating the CSI-RS resource and/or a CSI-RS port).

In some aspects, the first TRP 605*a* and/or the second TRP 605*b* may apply a scaling factor (e.g., associated with a determined CSI-RS capability) to a number times a CSI-RS resource and/or a number of times a CSI-RS port has been used by the UE 120 for multi-TRP CSI measurements to determine a number of active CSI-RS resources and/or a number of active CSI-RS ports associated with the UE 120. For example, if a scaling factor indicates a value of 4 and the UE 120 uses a CSI-RS resource for multi-TRP CSI measurement once, the first TRP 605*a* and/or the second TRP 605*b* may count the CSI-RS resource as being used 4 times (e.g., rather than one time) by the UE 120.

The first TRP 605*a* and/or the second TRP 605*b* may compare the number of active CSI-RS resources and/or the number of active CSI-RS ports to the determined CSI-RS capability of the UE 120. The first TRP 605*a* and/or the second TRP 605*b* may determine a CSI report configuration for the UE 120 for performing multi-TRP CSI measurement based at least in part on comparing the number of active CSI-RS resources and/or the number of active CSI-RS ports to the determined CSI-RS capability of the UE 120. For example, the first TRP 605*a* and/or the second TRP 605*b* may determine the CSI report configuration such that the CSI-RS capability of the UE 120 for multi-TRP CSI measurement is not exceeded (e.g., such that a number of CSI-RS resources supported by the UE 120, a number of CSI-RS ports per resource supported by the UE 120, and/or a total number of CSI-RS ports supported by the UE 120 is not exceeded).

As shown by reference number 625, the first TRP 605*a* and/or the second TRP 605*b* may transmit, to the UE 120, an indication of the CSI report configuration for multi-TRP CSI measurement that is based at least in part on a reported CSI-RS capability of the UE 120 for multi-TRP CSI measurement. As shown by reference number 630, the UE 120, the first TRP 605*a* and/or the second TRP 605*b* may perform the multi-TRP CSI measurement. For example, the first TRP 605*a* may transmit a first CSI-RS (e.g., using a first CSI-RS resource and/or a first CSI-RS port group) to the UE 120. The second TRP 605*b* may transmit a second CSI-RS (e.g., using a second CSI-RS resource and/or a second CSI-RS port group). The UE 120 may perform multi-TRP CSI measurement by measuring the first CSI-RS and/or the second CSI-RS. The UE 120 may transmit a CSI report to the first TRP 605*a* and/or the second TRP 605*b* indicating the multi-TRP CSI measurement (e.g., indicating one or more measurements of the first CSI-RS and/or one or more measurements of the second CSI-RS).

As a result, the network (e.g., the first TRP 605*a* and/or the second TRP 605*b*) may be enabled to more accurately determine a capability of the UE 120 for multi-TRP CSI measurement. Therefore, the network may not configure the UE 120 with a CSI-RS report configuration that exceeds the UE 120 capability. This may improve efficiency associated with multi-TRP CSI measurement as the UE 120 may not be configured with a CSI report configuration that exceeds the capability of the UE 120.

As indicated above, FIG. 6 is provided as an example. Other examples may differ from what is described with respect to FIG. 6.

Figure 7:
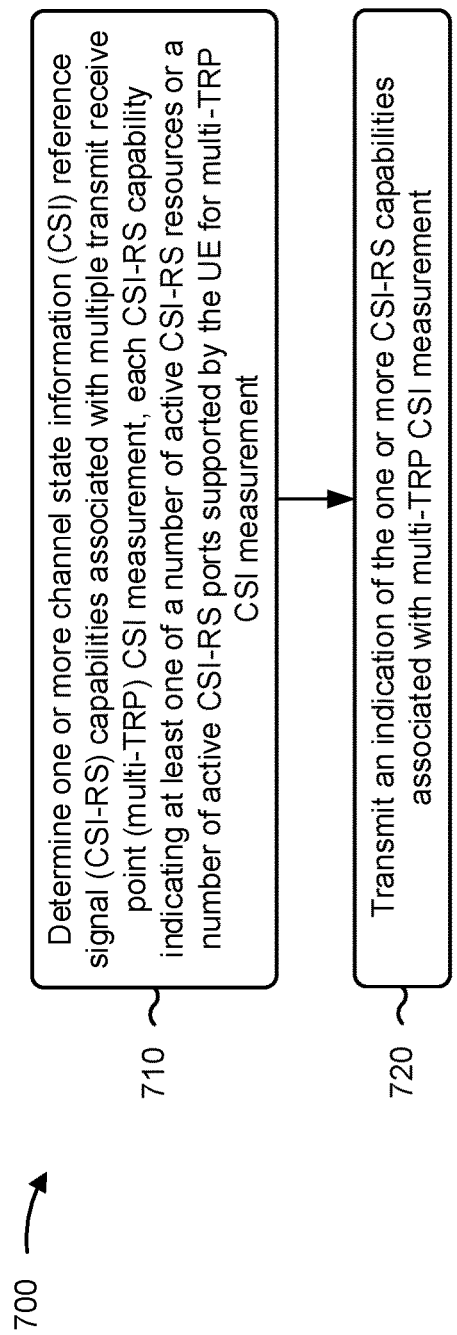
FIGS. 7 and 8 are diagrams illustrating example processes associated with CSI-RS capability reporting for multi-TRP CSI measurement, in accordance with various aspects of the present disclosure.

FIG. 7 is a diagram illustrating an example process 700 performed, for example, by a user equipment (UE), in accordance with various aspects of the present disclosure. Example process 700 is an example where the UE (e.g., UE 120) performs operations associated with CSI-RS capability reporting for multi-TRP CSI measurement.

As shown in FIG. 7, in some aspects, process 700 may include determining one or more CSI-RS capabilities associated with multi-TRP CSI measurement, each CSI-RS capability indicating at least one of a number of active CSI-RS resources or a number of active CSI-RS ports supported by the UE for multi-TRP CSI measurement (block 710). For example, the UE (e.g., using CSI-RS capability determination component 908, depicted in FIG. 9) may determine one or more CSI-RS capabilities associated with multi-TRP CSI measurement, each CSI-RS capability indicating at least one of a number of active CSI-RS resources or a number of active CSI-RS ports supported by the UE for multi-TRP CSI measurement, as described above.

As further shown in FIG. 7, in some aspects, process 700 may include transmitting an indication of the one or more CSI-RS capabilities associated with multi-TRP CSI measurement (block 720). For example, the UE (e.g., using transmission component 904, depicted in FIG. 9) may transmit an indication of the one or more CSI-RS capabilities associated with multi-TRP CSI measurement, as described above.

Process 700 may include additional aspects, such as any single aspect or any combination of aspects described below and/or in connection with one or more other processes described elsewhere herein.

In a first aspect, multi-TRP CSI measurement comprises one or more CSI measurements using at least two CSI port groups associated with different transmission configuration indicator (TCI) states or at least two CSI resources associated with different TCI states, wherein a first CSI port group or a first CSI resource associated with a first TCI state is associated with a transmission from a first TRP and a second CSI port group or a second CSI resource associated with a second TCI state is associated with a transmission from a second TRP.

In a second aspect, alone or in combination with the first aspect, the one or more CSI-RS capabilities associated with multi-TRP CSI measurement includes determining at least one of: a number of ports per TRP supported by the UE for multi-TRP CSI measurement, a number of multi-TRP CSI hypotheses supported by the UE for multi-TRP CSI measurement, or a total number of ports supported by the UE for multi-TRP CSI measurement.

In a third aspect, alone or in combination with one or more of the first and second aspects, determining the one or more CSI-RS capabilities associated with multi-TRP CSI measurement includes determining one or more codebook types supported by the UE, and determining, for each of the one or more codebook types, one or more CSI-RS capabilities associated with multi-TRP CSI measurement.

In a fourth aspect, alone or in combination with one or more of the first through third aspects, determining the number of ports per TRP supported by the UE includes determining at least one of: a number of ports per CSI-RS resource supported by the UE for multi-TRP CSI measurement, or a number of ports per CSI-RS port group supported by the UE for multi-TRP CSI measurement.

In a fifth aspect, alone or in combination with one or more of the first through fourth aspects, determining the number of multi-TRP CSI hypothesis supported by the UE includes determining at least one of: a number of CSI-RS resources supported by the UE for multi-TRP CSI measurement, a number of CSI-RS port group pairs supported by the UE for multi-TRP CSI measurement, or a number of CSI-RS resource pairs supported by the UE for multi-TRP CSI measurement.

In a sixth aspect, alone or in combination with one or more of the first through fifth aspects, determining the one or more CSI-RS capabilities associated with multi-TRP CSI measurement includes determining the one or more CSI-RS capabilities, per frequency band supported by the UE, associated with multi-TRP CSI measurement; and transmitting the indication of the one more one or more CSI-RS capabilities includes transmitting an indication of the one or more CSI-RS capabilities for multi-TRP CSI measurement per frequency band.

In a seventh aspect, alone or in combination with one or more of the first through sixth aspects, determining the one or more CSI-RS capabilities associated with multi-TRP CSI measurement includes determining the one or more CSI-RS capabilities, per frequency band combination supported by the UE, associated with multi-TRP CSI measurement; and transmitting the indication of the one more one or more CSI-RS capabilities includes transmitting an indication of the one or more CSI-RS capabilities for multi-TRP CSI measurement per frequency band combination.

In an eighth aspect, alone or in combination with one or more of the first through seventh aspects, determining the one or more CSI-RS capabilities associated with multi-TRP CSI measurement includes determining one or more sets of concurrent codebooks supported by the UE, where a set of concurrent codebooks, included in the one or more set of concurrent codebooks, includes two or more codebooks whose associated CSI-RSs are to be counted towards active CSI-RS resources and CSI-RS ports concurrently in a slot and an indication of whether the set of concurrent codebooks is associated with single TRP communications or multi-TRP communications, and determining, for each set of concurrent codebooks included in the one or more sets of concurrent codebooks, one or more CSI-RS capabilities associated with multi-TRP CSI measurement; and transmitting the indication of the one or more CSI-RS capabilities includes transmitting an indication of the one or more sets of concurrent codebooks supported by the UE, and transmitting, for each set of concurrent codebooks included in the one or more sets of concurrent codebooks, an indication of the one or more CSI-RS capabilities.

In a ninth aspect, alone or in combination with one or more of the first through eighth aspects, determining the one or more CSI-RS capabilities associated with multi-TRP CSI measurement includes determining a set of codebook pairs associated with multi-TRP communications supported by the UE, and determining, for each codebook pair included in the set of codebook pairs, one or more CSI-RS capabilities associated with multi-TRP CSI measurement.

In a tenth aspect, alone or in combination with one or more of the first through ninth aspects, process 700 includes determining a codebook pair that includes a first codebook to be used by a first TRP associated with a multi-TRP communication and a second codebook to be used by a second TRP associated with the multi-TRP communication.

In an eleventh aspect, alone or in combination with one or more of the first through tenth aspects, transmitting the indication of the one or more CSI-RS capabilities associated with multi-TRP CSI measurement includes transmitting an indication of the set of codebook pairs supported by the UE, and transmitting one or more CSI-RS capabilities, associated with multi-TRP CSI measurement, for each set of codebook pairs supported by the UE.

In a twelfth aspect, alone or in combination with one or more of the first through eleventh aspects, determining the one or more CSI-RS capabilities associated with multi-TRP CSI measurement comprises includes determining one or more sets of concurrent codebooks supported by the UE, where a set of concurrent codebooks, included in the one or more set of concurrent codebooks, includes two or more codebooks whose associated CSI-RSs are to be counted towards active CSI-RS resources and CSI-RS ports concurrently in a slot, at least one codebook of the two or more codebooks being a codebook pair, and an indication of whether the set of concurrent codebooks is associated with single TRP communications or multi-TRP communications, and determining, for each set of concurrent codebooks included in the one or more sets of concurrent codebooks, one or more CSI-RS capabilities associated with multi-TRP CSI measurement; and transmitting the indication of the one or more CSI-RS capabilities includes transmitting an indication of the one or more sets of concurrent codebooks supported by the UE, and transmitting, for each set of concurrent codebooks included in the one or more sets of concurrent codebooks, an indication of the one or more CSI-RS capabilities.

In a thirteenth aspect, alone or in combination with one or more of the first through twelfth aspects, process 700 includes receiving a CSI-RS reporting configuration, or a request, for multi-TRP CSI measurement that is based at least in part on indication of the one or more CSI-RS capabilities associated with multi-TRP CSI measurement, the CSI-RS reporting configuration indicating at least one of: one or more CSI-RS resources, one or more CSI-RS ports, or one or more CSI-RS port groups.

In a fourteenth aspect, alone or in combination with one or more of the first through thirteenth aspects, process 700 includes determining a CSI-RS resource and a CSI-RS port is used for multiple multi-TRP CSI hypothesis, and determining a number of active resource and a number of active port for the CSI-RS resource and the CSI-RS port based on the number of multi-TRP CSI hypothesis.

In a fifteenth aspect, alone or in combination with one or more of the first through fourteenth aspects, determining the one or more CSI-RS capabilities associated with multi-TRP CSI measurement includes determining at least one of: one or more CSI-RS capabilities associated with SDM multi-TRP CSI measurement, where SDM multi-TRP CSI measurement comprises calculating two precoding matrix indicators (PMIs) assuming different layers of a transmission associated with the two PMIs are transmitted on a same frequency domain resource and a same time domain resource, one or more CSI-RS capabilities associated with single frequency network (SFN) multi-TRP CSI measurement, where SFN multi-TRP CSI measurement comprises calculating two PMIs assuming one or more layers of a transmission associated with the two PMIs are transmitted on a same frequency domain resource and a same time domain resource, one or more CSI-RS capabilities associated with FDM multi-TRP CSI measurement, where FDM multi-TRP CSI measurement comprises calculating two PMIs assuming one or more layers of a transmission associated with the two PMIs are transmitted on different frequency domain resources, or one or more CSI-RS capabilities associated with TDM multi-TRP CSI measurement, where TDM multi-TRP CSI measurement comprises calculating two PMIs assuming one or more layers of a transmission associated with the two PMIs are transmitted on different time domain resources.

In a sixteenth aspect, alone or in combination with one or more of the first through fifteenth aspects, transmitting the indication of the one or more CSI-RS capabilities associated with multi-TRP CSI measurement includes transmitting an indication of at least one of: one or more CSI-RS capabilities associated with SDM multi-TRP CSI measurement, one or more CSI-RS capabilities associated with SFN multi-TRP CSI measurement, one or more CSI-RS capabilities associated with FDM multi-TRP CSI measurement, or one or more CSI-RS capabilities associated with TDM multi-TRP CSI measurement.

In a seventeenth aspect, alone or in combination with one or more of the first through sixteenth aspects, transmitting the indication of the one or more CSI-RS capabilities associated with multi-TRP CSI measurement includes transmitting an indication of one or more scaling factors associated with the one or more CSI-RS capabilities, where a scaling factor indicates a number of times that a CSI-RS resource or CSI-RS port are to be counted towards a number of active CSI-RS resources or active CSI-RS ports when used by the UE for multi-TRP CSI measurement.

In an eighteenth aspect, alone or in combination with one or more of the first through seventeenth aspects, transmitting the indication of the one or more CSI-RS capabilities associated with multi-TRP CSI measurement includes transmitting an indication of one or more scaling factor that are to be applied if a CSI-RS resource or CSI-RS port is used for single TRP CSI measurement and multi-TRP CSI measurement.

In a nineteenth aspect, alone or in combination with one or more of the first through eighteenth aspects, transmitting the indication of the one or more CSI-RS capabilities associated with multi-TRP CSI measurement includes transmitting an indication of one or more scaling factors that are to be applied if a CSI-RS resource or CSI-RS port is used for multi-TRP CSI measurement.

In a twentieth aspect, alone or in combination with one or more of the first through nineteenth aspects, determining the one or more CSI-RS capabilities associated with multi-TRP CSI measurement determining one or more scaling factors for at least one of: each codebook type supported by the UE, each set of concurrent codebooks supported by the UE, a subset of codebook types from all codebook types supported by the UE, or a subset of set of concurrent codebooks from all sets of concurrent codebooks supported by the UE, where a number of scaling factors included in the one or more scaling factors is equal to a number of CSI-RS capabilities reported by the UE, and determining an order of the one or more scaling factors based at least in part on a one-to-one mapping between each scaling factor included in the set of scaling factors and each CSI-RS capability reported by the UE, and transmitting the indication of the one or more CSI-RS capabilities associated with multi-TRP CSI measurement includes transmitting an indication of at least one of: the one or more scaling factors per codebook supported by the UE, or the one or more scaling factors per set of concurrent codebooks supported by the UE.

In a twenty-first aspect, alone or in combination with one or more of the first through twentieth aspects, transmitting the indication of the one or more CSI-RS capabilities associated with multi-TRP CSI measurement includes transmitting an indication of at least one of: one or more scaling factors per frequency band supported by the UE, or one or more scaling factors per frequency band combination supported by the UE.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
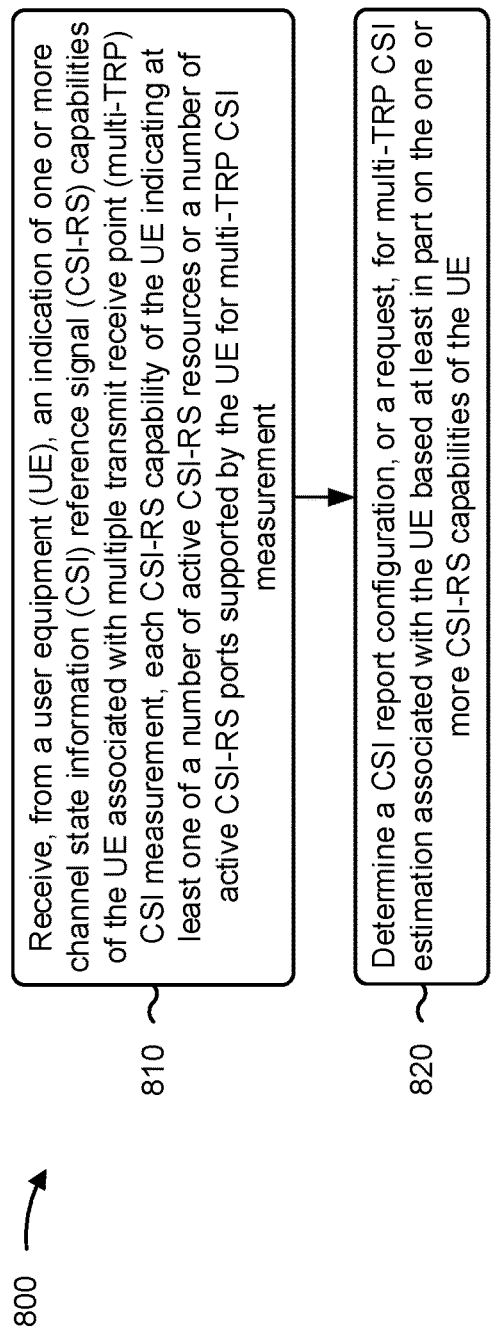

FIG. 8 is a diagram illustrating an example process 800 performed, for example, by a base station, in accordance with various aspects of the present disclosure. Example process 800 is an example where the base station (e.g., base station 110 and/or a TRP) performs operations associated with CSI-RS capability reporting for multi-TRP CSI measurement.

As shown in FIG. 8, in some aspects, process 800 may include receiving, from a UE, an indication of one or more CSI-RS capabilities of the UE associated with multi-TRP CSI measurement, each CSI-RS capability of the UE indicating at least one of a number of active CSI-RS resources or a number of active CSI-RS ports supported by the UE for multi-TRP CSI measurement (block 810). For example, the base station (e.g., using reception component 1002, depicted in FIG. 10) may receive, from a UE, an indication of one or more CSI-RS capabilities of the UE associated with multi-TRP CSI measurement, each CSI-RS capability of the UE indicating at least one of a number of active CSI-RS resources or a number of active CSI-RS ports supported by the UE for multi-TRP CSI measurement, as described above.

As further shown in FIG. 8, in some aspects, process 800 may include determining a CSI report configuration, or a request, for multi-TRP CSI measurement associated with the UE based at least in part on the one or more CSI-RS capabilities of the UE (block 820). For example, the base station (e.g., using CSI report configuration determination component 1008, depicted in FIG. 10) may determine a CSI report configuration, or a request, for multi-TRP CSI measurement associated with the UE based at least in part on the one or more CSI-RS capabilities of the UE, as described above.

Process 800 may include additional aspects, such as any single aspect or any combination of aspects described below and/or in connection with one or more other processes described elsewhere herein.

In a first aspect, multi-TRP CSI measurement comprises one or more CSI measurements performed by the UE using at least two CSI port groups associated with different transmission configuration indicator (TCI) states or at least two CSI resources associated with different transmission configuration indicator (TCI) states, wherein a first CSI port group or a first CSI resource associated with a first TCI state is associated with a transmission from a first TRP and a second CSI port group or a second CSI resource associated with a second TCI state is associated with a transmission from a second TRP.

In a second aspect, alone or in combination with the first aspect, receiving the indication of the one or more CSI-RS capabilities of the UE associated with multi-TRP CSI measurement includes receiving an indication of at least one of: a number of ports per TRP supported by the UE for multi-TRP CSI measurement, a number of multi-TRP CSI hypotheses supported by the UE for multi-TRP CSI measurement, or a total number of ports supported by the UE for multi-TRP CSI measurement.

In a third aspect, alone or in combination with one or more of the first and second aspects, receiving the indication of the one or more CSI-RS capabilities of the UE associated with multi-TRP CSI measurement includes receiving an indication of one or more codebook types supported by the UE, and one or more CSI-RS capabilities, for each of the one or more codebook types, associated with multi-TRP CSI measurement.

In a fourth aspect, alone or in combination with one or more of the first through third aspects, receiving the indication of the one or more CSI-RS capabilities of the UE associated with multi-TRP CSI measurement includes receiving an indication of at least one of: a number of ports per CSI-RS resource supported by the UE for multi-TRP CSI measurement, or a number of ports per CSI-RS port group supported by the UE for multi-TRP CSI measurement.

In a fifth aspect, alone or in combination with one or more of the first through fourth aspects, receiving the indication of the one or more CSI-RS capabilities of the UE associated with multi-TRP CSI measurement includes receiving an indication of at least one of: a number of CSI-RS resources supported by the UE for multi-TRP CSI measurement, a number of CSI-RS port group pairs supported by the UE for multi-TRP CSI measurement, or a number of CSI-RS resource pairs supported by the UE for multi-TRP CSI measurement.

In a sixth aspect, alone or in combination with one or more of the first through fifth aspects, receiving the indication of the one or more CSI-RS capabilities of the UE associated with multi-TRP CSI measurement includes receiving an indication of one or more CSI-RS capabilities of the UE, per frequency band supported by the UE, associated with multi-TRP CSI measurement.

In a seventh aspect, alone or in combination with one or more of the first through sixth aspects, receiving the indication of the one or more CSI-RS capabilities of the UE associated with multi-TRP CSI measurement receiving an indication of one or more CSI-RS capabilities of the UE, per frequency band combination supported by the UE, associated with multi-TRP CSI measurement.

In an eighth aspect, alone or in combination with one or more of the first through seventh aspects, receiving the indication of the one or more CSI-RS capabilities of the UE associated with multi-TRP CSI measurement includes receiving an indication of one or more sets of concurrent codebooks supported by the UE, where a set of concurrent codebook, included in the one or more sets of concurrent codebooks, includes two or more codebooks and an indication of whether the set of concurrent codebooks is associated with single TRP communications or multi-TRP communications, and one or more CSI-RS capabilities of the UE, for each set of concurrent codebooks included in the one or more sets of concurrent codebooks, associated with multi-TRP CSI measurement.

In a ninth aspect, alone or in combination with one or more of the first through eighth aspects, receiving the indication of the one or more CSI-RS capabilities of the UE associated with multi-TRP CSI measurement includes receiving an indication of one or more sets of concurrent codebooks supported by the UE, where a set of concurrent codebooks, included in the one or more set of concurrent codebooks, includes two or more codebooks whose associated CSI-RSs are to be counted towards active CSI-RS resources and CSI-RS ports concurrently in a slot, at least one codebook of the two or more codebooks being a codebook pair, and an indication of whether the set of concurrent codebooks is associated with single TRP communications or multi-TRP communications, and one or more CSI-RS capabilities of the UE, associated with multi-TRP CSI measurement, corresponding to each of the one or more sets of concurrent codebooks supported by the UE.

In a tenth aspect, alone or in combination with one or more of the first through ninth aspects, receiving the indication of the one or more CSI-RS capabilities of the UE associated with multi-TRP CSI measurement includes receiving an indication of a set of codebook pairs associated with multi-TRP communications supported by the UE, and one or more CSI-RS capabilities of the UE, for each codebook pair included in the set of codebook pairs, associated with multi-TRP CSI measurement.

In an eleventh aspect, alone or in combination with one or more of the first through tenth aspects, process 800 includes transmitting, to the UE, the CSI-RS reporting configuration for multi-TRP CSI measurement indicating at least one of: one or more CSI-RS resources, one or more CSI-RS ports, or one or more CSI-RS port groups.

In a twelfth aspect, alone or in combination with one or more of the first through eleventh aspects, determining the CSI report configuration for multi-TRP CSI measurement associated with the UE includes determining a number of CSI-RS resources and a number of CSI-RS ports used by the UE to perform multi-TRP CSI measurements, comparing the number of CSI-RS resources and the number of CSI-RS ports to a CSI-RS capability of the UE associated with multi-TRP CSI measurement, and determining the CSI report configuration for multi-TRP CSI measurement associated with the UE based at least in part on comparing the number of CSI-RS resources and the number of CSI-RS ports to the CSI-RS capability of the UE associated with multi-TRP CSI measurement.

In a thirteenth aspect, alone or in combination with one or more of the first through twelfth aspects, receiving the indication of the one or more CSI-RS capabilities of the UE associated with multi-TRP CSI measurement includes receiving an indication of at least one of: one or more CSI-RS capabilities of the UE associated with spatial division multiplexing multi-TRP CSI measurement, one or more CSI-RS capabilities associated with single frequency network multi-TRP CSI measurement, one or more CSI-RS capabilities of the UE associated with frequency division multiplexing multi-TRP CSI measurement, or one or more CSI-RS capabilities of the UE associated with time division multiplexing multi-TRP CSI measurement.

In a fourteenth aspect, alone or in combination with one or more of the first through thirteenth aspects, receiving the indication of the one or more CSI-RS capabilities of the UE associated with multi-TRP CSI measurement includes receiving, from the UE, an indication of one or more scaling factors associated with one or more CSI-RS capabilities of the UE, where a scaling factor indicates a number of times that a CSI-RS resource or CSI-RS port are to be counted towards a number of active CSI-RS resources or active CSI-RS ports when used by the UE for multi-TRP CSI measurement.

In a fifteenth aspect, alone or in combination with one or more of the first through fourteenth aspects, receiving the indication of the one or more CSI-RS capabilities of the UE associated with multi-TRP CSI measurement includes receiving, from the UE, an indication of one or more scaling factors that are to be applied if a CSI-RS resource or CSI-RS port is used by the UE for single TRP CSI measurement and multi-TRP CSI measurement.

In a sixteenth aspect, alone or in combination with one or more of the first through fifteenth aspects, receiving the indication of the one or more CSI-RS capabilities of the UE associated with multi-TRP CSI measurement includes receiving, from the UE, an indication of one or more scaling factors that are to be applied if a CSI-RS resource or CSI-RS port is used by the UE for multi-TRP CSI measurement.

In an seventeenth aspect, alone or in combination with one or more of the first through sixteenth aspects, receiving the indication of the one or more CSI-RS capabilities of the UE associated with multi-TRP CSI measurement includes receiving, from the UE, an indication of at least one of: one or more scaling factors per codebook supported by the UE, or one or more scaling factors per set of concurrent codebooks supported by the UE.

In an eighteenth aspect, alone or in combination with one or more of the first through seventeenth aspects, receiving the indication of the one or more CSI-RS capabilities of the UE associated with multi-TRP CSI measurement includes receiving an indication of a scaling factor per CSI-RS capability of the UE.

In a nineteenth aspect, alone or in combination with one or more of the first through eighteenth aspects, receiving the indication of the one or more CSI-RS capabilities of the UE associated with multi-TRP CSI measurement includes receiving, from the UE, an indication of at least one of: one or more scaling factors per frequency band supported by the UE, or one or more scaling factors per frequency band combination supported by the UE.

In a twentieth aspect, alone or in combination with one or more of the first through nineteenth aspects, process 800 includes determining a number of active CSI-RS resources or active CSI-RS ports associated with the UE, where determining the CSI report configuration for multi-TRP CSI measurement associated with the UE is based at least in part on the number of active CSI-RS resources or active CSI-RS ports associated with the UE.

In a twenty-first aspect, alone or in combination with one or more of the first through twentieth aspects, determining the number of active CSI-RS resources or active CSI-RS ports associated with the UE includes determining a number of multi-TRP CSI measurements performed by the UE using a CSI-RS resource, and determining the number of active CSI-RS resources or active CSI-RS ports based at least in part on the number of multi-TRP CSI measurements performed by the UE using the CSI-RS resource.

In a twenty-second aspect, alone or in combination with one or more of the first through twenty-first aspects, determining the number of active CSI-RS resources or active CSI-RS ports associated with the UE includes determining a number of multi-TRP CSI measurements performed by the UE using a CSI-RS resource, applying a scaling factor, associated with a single TRP CSI-RS capability of the UE, to the number of multi-TRP CSI measurements performed by the UE using the CSI-RS resource, and determining the number of active CSI-RS resources or active CSI-RS ports based at least in part on applying the scaling factor to the number of multi-TRP CSI measurements performed by the UE using the CSI-RS resource.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
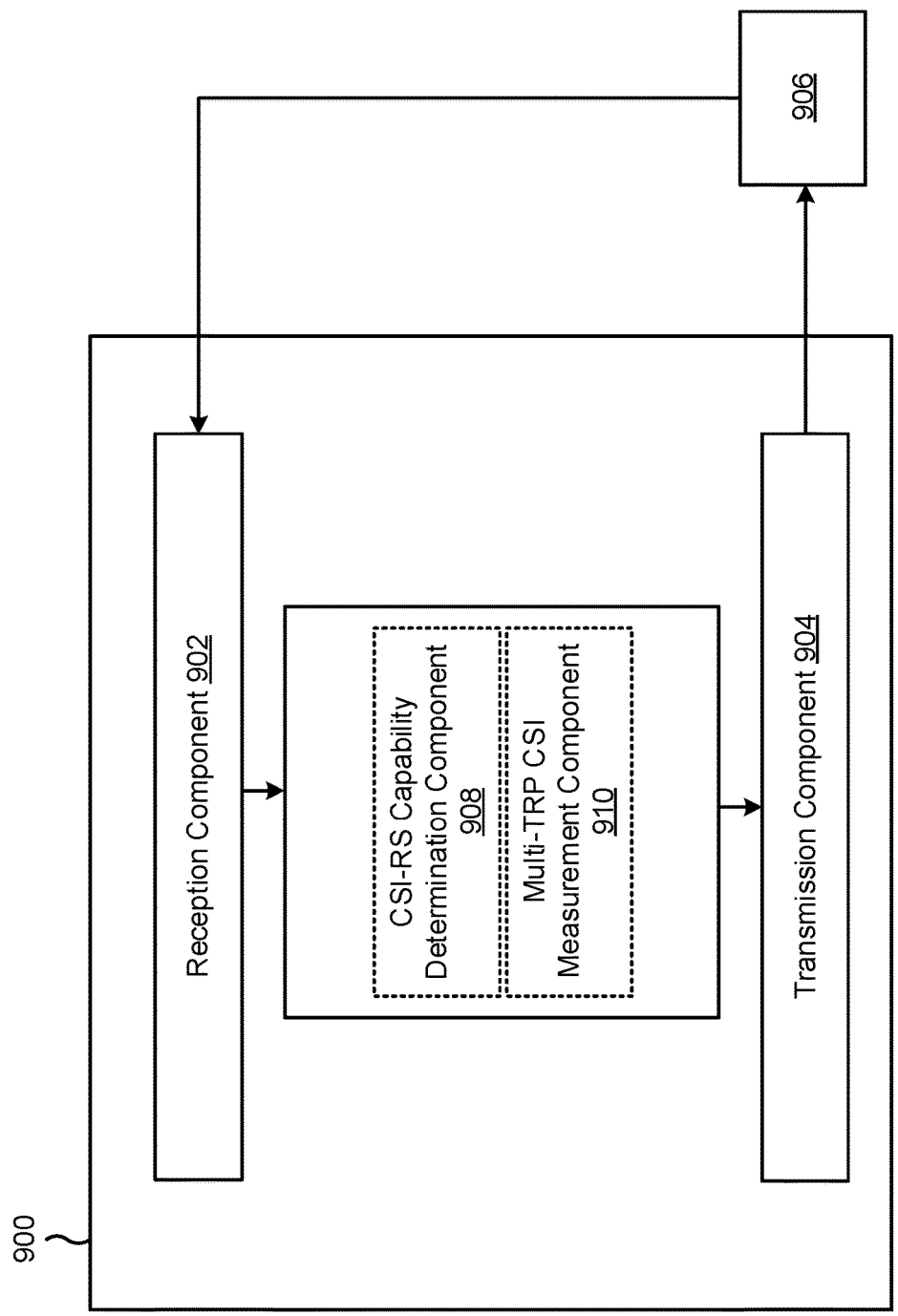
FIGS. 9 and 10 are block diagrams of example apparatuses for wireless communication, in accordance with various aspects of the present disclosure.

FIG. 9 is a block diagram of an example apparatus 900 for wireless communication. The apparatus 900 may be a UE, or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include one or more of a CSI-RS capability determination component 908, or a multi-TRP CSI measurement component 910, among other examples.

In some aspects, the apparatus 900 may be configured to perform one or more operations described herein in connection with FIG. 6. Additionally, or alternatively, the apparatus 900 may be configured to perform one or more processes described herein, such as process 700 of FIG. 7, or a combination thereof. In some aspects, the apparatus 900 and/or one or more components shown in FIG. 9 may include one or more components of the UE described above in connection with FIG. 2. Additionally, or alternatively, one or more components shown in FIG. 9 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a demodulator, a MIMO detector, a receive processor, a controller/processor, a memory, or a combination thereof, of the UE described above in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modulator, a transmit MIMO processor, a transmit processor, a controller/processor, a memory, or a combination thereof, of the UE described above in connection with FIG. 2. In some aspects, the transmission component 904 may be collocated with the reception component 902 in a transceiver.

The CSI-RS capability determination component 908 may determine one or more CSI-RS capabilities associated with multi-TRP CSI measurement, each CSI-RS capability indicating at least one of a number of active CSI-RS resources or a number of active CSI-RS ports supported by the UE for multi-TRP CSI measurement. In some aspects, the CSI-RS capability determination component 908 may include a receive processor, a transmit MIMO processor, a transmit processor, a controller/processor, a memory, or a combination thereof, of the UE described above in connection with FIG. 2. The transmission component 904 may transmit an indication of the one or more CSI-RS capabilities associated with multi-TRP CSI measurement.

The CSI-RS capability determination component 908 may determine one or more codebook types supported by the UE. The CSI-RS capability determination component 908 may determine, for each of the one or more codebook types, one or more CSI-RS capabilities associated with multi-TRP CSI measurement.

The CSI-RS capability determination component 908 may determine one or more CSI-RS capabilities, per frequency band supported by the UE, associated with multi-TRP CSI measurement. The CSI-RS capability determination component 908 may determine one or more CSI-RS capabilities, per frequency band combination supported by the UE, associated with multi-TRP CSI measurement.

The CSI-RS capability determination component 908 may determine one or more sets of concurrent codebooks supported by the UE. The CSI-RS capability determination component 908 may determine, for each set of concurrent codebooks included in the one or more sets of concurrent codebooks, one or more CSI-RS capabilities associated with multi-TRP CSI measurement. The transmission component 904 may transmit an indication of one or more sets of concurrent codebooks supported by the UE. The transmission component 904 may transmit one or more CSI-RS capabilities, associated with multi-TRP CSI measurement, corresponding to each of the one or more sets of concurrent codebooks supported by the UE.

The CSI-RS capability determination component 908 may determine a set of codebook pairs associated with multi-TRP communications supported by the UE. The CSI-RS capability determination component 908 may determine, for each codebook pair included in the set of codebook pairs, one or more CSI-RS capabilities associated with multi-TRP CSI measurement. The CSI-RS capability determination component 908 may determine a codebook pair that includes a first codebook to be used by a first TRP associated with a multi-TRP communication and a second codebook to be used by a second TRP associated with the multi-TRP communication. The transmission component 904 may transmit an indication of the set of codebook pairs supported by the UE. The transmission component 904 may transmit one or more CSI-RS capabilities, associated with multi-TRP CSI measurement, corresponding to each of the set of codebook pairs supported by the UE.

The reception component 902 may receive a CSI-RS reporting configuration, or a request, for multi-TRP CSI measurement that is based at least in part on indication of the one or more CSI-RS capabilities associated with multi-TRP CSI measurement, the CSI-RS reporting configuration indicating at least one of: one or more CSI-RS resources, one or more CSI-RS ports, or one or more CSI-RS port groups. The multi-TRP CSI measurement component 910 may perform one or more multi-TRP CSI measurements using a CSI-RS resource and a CSI-RS port. In some aspects, the multi-TRP CSI measurement component 910 may include one or more antennas, a demodulator, a MIMO detector, a receive processor, a modulator, a transmit MIMO processor, a transmit processor, a controller/processor, a memory, or a combination thereof, of the UE described above in connection with FIG. 2.

The transmission component 904 may transmit an indication of one or more scaling factors associated with a CSI-RS capability. The transmission component 904 may transmit an indication of one or more scaling factors that are to be applied if a CSI-RS resource or CSI-RS port is used for single TRP CSI measurement and multi-TRP CSI measurement. The transmission component 904 may transmit an indication of one or more scaling factors that re to be applied if a CSI-RS resource or CSI-RS port is used for multi-TRP CSI measurement. The transmission component 904 may transmit an indication of at least one of: one or more scaling factors per codebook supported by the UE 120, or one or more scaling factors per set of concurrent codebooks supported by the UE 120. The transmission component 904 may transmit an indication of one or more scaling factors per CSI-RS capability associated with the UE 120. The transmission component 904 may transmit an indication of at least one of: one or more scaling factors per frequency band supported by the UE 120, or one or more scaling factors per frequency band combination supported by the UE 120.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
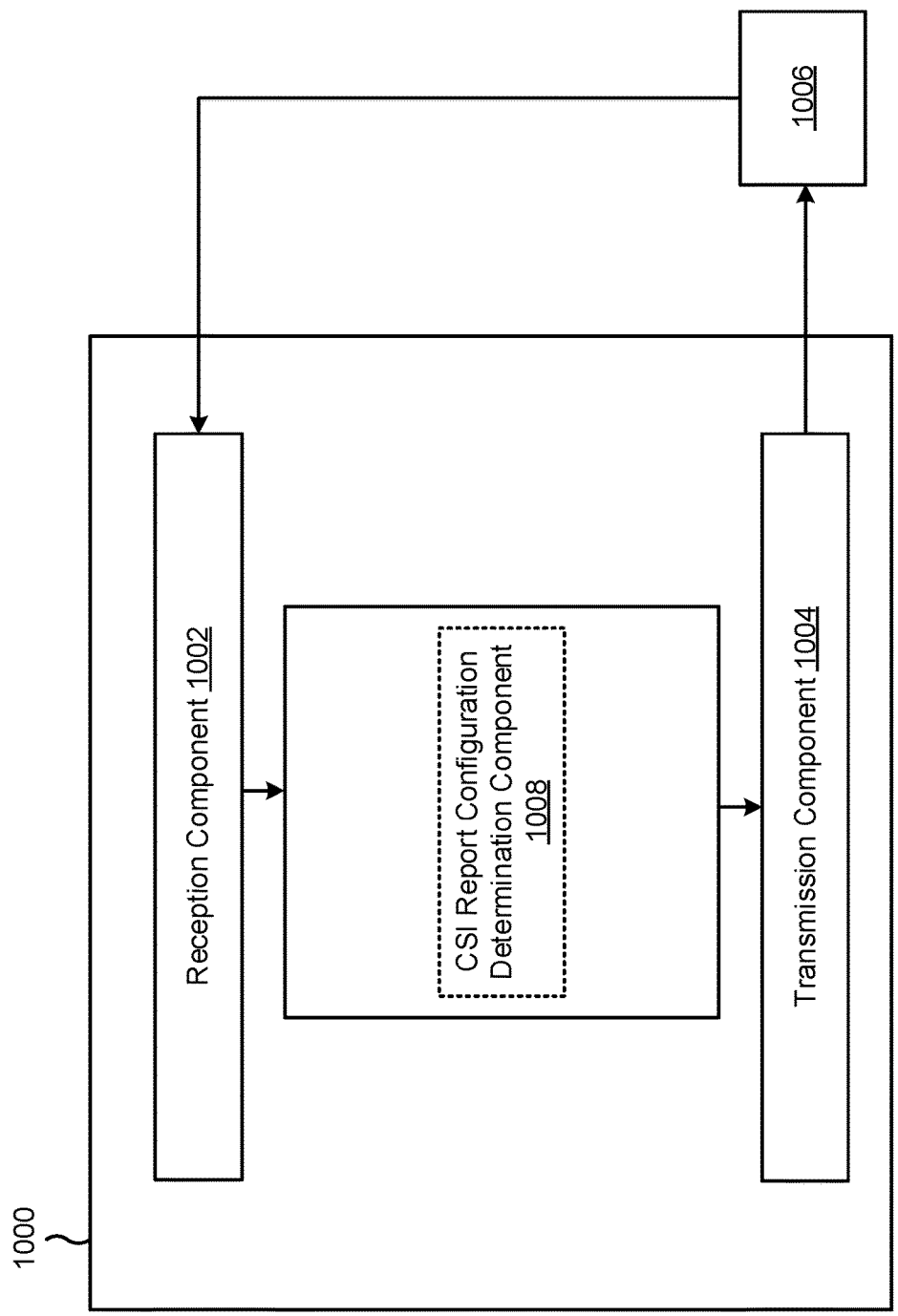

FIG. 10 is a block diagram of an example apparatus 1000 for wireless communication. The apparatus 1000 may be a base station (or a TRP), or a base station (or a TRP) may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include a CSI report configuration determination component 1008, among other examples.

In some aspects, the apparatus 1000 may be configured to perform one or more operations described herein in connection with FIG. 6. Additionally, or alternatively, the apparatus 1000 may be configured to perform one or more processes described herein, such as process 800 of FIG. 8, or a combination thereof. In some aspects, the apparatus 1000 and/or one or more components shown in FIG. 10 may include one or more components of the base station described above in connection with FIG. 2. Additionally, or alternatively, one or more components shown in FIG. 10 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1006. In some aspects, the reception component 1002 may include one or more antennas, a demodulator, a MIMO detector, a receive processor, a controller/processor, a memory, or a combination thereof, of the base station described above in connection with FIG. 2.

The transmission component 1004 may transmit communications, such as reference signals, control information, data communications, or a combination thereof, to the apparatus 1006. In some aspects, one or more other components of the apparatus 1006 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modulator, a transmit MIMO processor, a transmit processor, a controller/processor, a memory, or a combination thereof, of the base station described above in connection with FIG. 2. In some aspects, the transmission component 1004 may be collocated with the reception component 1002 in a transceiver.

The reception component 1002 may receive, from a UE, an indication of one or more CSI-RS capabilities of the UE associated with multi-TRP CSI measurement, each CSI-RS capability of the UE indicating at least one of a number of active CSI-RS resources or a number of active CSI-RS ports supported by the UE for multi-TRP CSI measurement. The CSI report configuration determination component 1008 may determine a CSI report configuration, or a request, for multi-TRP CSI measurement associated with the UE based at least in part on the one or more CSI-RS capabilities of the UE. In some aspects, the CSI report configuration determination component 1008 may include a receive processor, a transmit MIMO processor, a transmit processor, a controller/processor, a memory, or a combination thereof, of the base station described above in connection with FIG. 2.

The reception component 1002 may receive an indication of one or more CSI-RS capabilities of the UE, per frequency band supported by the UE, associated with multi-TRP CSI measurement. The reception component 1002 may receive an indication of one or more CSI-RS capabilities of the UE, per frequency band combination supported by the UE, associated with multi-TRP CSI measurement.

The transmission component 1004 may transmit, to the UE, the CSI-RS reporting configuration, or the request, for multi-TRP CSI measurement indicating at least one of: one or more CSI-RS resources, one or more CSI-RS ports, or one or more CSI-RS port groups.

The CSI report configuration determination component 1008 may determine a number of CSI-RS resources and a number of CSI-RS ports used by the UE to perform multi-TRP CSI measurements. The CSI report configuration determination component 1008 may compare the number of CSI-RS resources and the number of CSI-RS ports to a CSI-RS capability of the UE associated with multi-TRP CSI measurement. The CSI report configuration determination component 1008 may determine the CSI report configuration for multi-TRP CSI measurement associated with the UE based at least in part on comparing the number of CSI-RS resources and the number of CSI-RS ports to the CSI-RS capability of the UE associated with multi-TRP CSI measurement.

The reception component 1002 may receive, from the UE, an indication of one or more scaling factors associated with a CSI-RS capability of the UE. The reception component 1002 may receive, from the UE, an indication of one or more scaling factors that are to be applied if a CSI-RS resource or CSI-RS port is used by the UE for single TRP CSI measurement and multi-TRP CSI measurement. The reception component 1002 may receive, from the UE, an indication of one or more scaling factors that are to be applied if a CSI-RS resource or CSI-RS port is used by the UE for multi-TRP CSI measurement.

The reception component 1002 may receive, from the UE, an indication of at least one of: one or more scaling factors per codebook supported by the UE, or one or more scaling factors per set of concurrent codebooks supported by the UE. The reception component 1002 may receive an indication of one or more scaling factors per CSI-RS capability of the UE. The reception component 1002 may receive, from the UE, an indication of at least one of: one or more scaling factors per frequency band supported by the UE, or one or more scaling factors per frequency band combination supported by the UE.

The CSI report configuration determination component 1008 may determine a number of active CSI-RS resources or active CSI-RS ports associated with the UE, where determining the CSI report configuration for multi-TRP CSI measurement associated with the UE is based at least in part on the number of active CSI-RS resources or active CSI-RS ports associated with the UE.

The CSI report configuration determination component 1008 may determine a number of multi-TRP CSI measurements performed by the UE using a CSI-RS resource. The CSI report configuration determination component 1008 may determine the number of active CSI-RS resources or active CSI-RS ports based at least in part on the number of multi-TRP CSI measurements performed by the UE using the CSI-RS resource.

The CSI report configuration determination component 1008 may determine a number of multi-TRP CSI measurements performed by the UE using a CSI-RS resource. The CSI report configuration determination component 1008 may apply a scaling factor, associated with a CSI-RS capability of the UE, to the number of multi-TRP CSI measurements performed by the UE using the CSI-RS resource. The CSI report configuration determination component 1008 may determine the number of active CSI-RS resources or active CSI-RS ports based at least in part on applying the scaling factor to the number of multi-TRP CSI measurements performed by the UE using the CSI-RS resource.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
   transmitting an indication of one or more channel state information (CSI) reference signal (CSI-RS) capabilities associated with multiple transmit receive point (multi-TRP) CSI measurement, each CSI-RS capability indicating at least one of a number of active CSI-RS resources or a number of active CSI-RS ports supported by the UE for multi-TRP CSI measurement, wherein the one or more CSI-RS capabilities associated with multi-TRP CSI measurement are associated with triplets of a maximum number of ports per CSI-RS resource of a band combination, a maximum number of CSI-RS resources supported by the UE for multi-TRP CSI measurement in the band combination, and a total number of ports supported by the UE for multi-TRP CSI measurement in the band combination; and
   receiving a CSI-RS reporting configuration, or a request, for multi-TRP CSI measurement that is based at least in part on the indication of the one or more CSI-RS capabilities associated with multi-TRP CSI measurement.

2. The method of claim 1,
   wherein the multi-TRP CSI measurement comprises one or more CSI measurements using at least two CSI port groups associated with different transmission configuration indicator (TCI) states or at least two CSI resources associated with different TCI states, wherein a first CSI port group or a first CSI resource associated with a first TCI state is associated with a transmission from a first TRP and a second CSI port group or a second CSI resource associated with a second TCI state is associated with a transmission from a second TRP.

3. The method of claim 1,
   wherein the one or more CSI-RS capabilities associated with multi-TRP CSI measurement are associated with at least one of:
      a number of ports per TRP supported by the UE for multi-TRP CSI measurement,
      a number of multi-TRP CSI hypotheses supported by the UE for multi-TRP CSI measurement, or
      a total number of ports supported by the UE for multi-TRP CSI measurement.

4. The method of claim 1,
   wherein the one or more CSI-RS capabilities associated with multi-TRP CSI measurement are associated with one or more codebook types supported by the UE; and
   wherein transmitting the indication of the one or more CSI-RS capabilities comprises:
      transmitting one or more CSI-RS capabilities for each codebook type.

5. The method of claim 1,
   wherein the one or more CSI-RS capabilities associated with multi-TRP CSI measurement are associated with one or more CSI-RS capabilities, per frequency band supported by the UE, associated with multi-TRP CSI measurement; and wherein transmitting the indication of the one or more CSI-RS capabilities comprises:

transmitting an indication of the one or more CSI-RS capabilities for multi-TRP CSI measurement per frequency band.

6. The method of claim 1,
wherein the one or more CSI-RS capabilities associated with multi-TRP CSI measurement are associated with one or more CSI-RS capabilities, per frequency band combination supported by the UE, associated with multi-TRP CSI measurement; and
wherein transmitting the indication of the one or more CSI-RS capabilities comprises:
transmitting an indication of the one or more CSI-RS capabilities for multi-TRP CSI measurement per frequency band combination.

7. The method of claim 1,
wherein the one or more CSI-RS capabilities associated with multi-TRP CSI measurement are associated with one or more sets of concurrent codebooks supported by the UE, wherein a set of concurrent codebooks, included in the one or more set of concurrent codebooks, includes two or more codebooks whose associated CSI-RSs are to be counted towards active CSI-RS resources and CSI-RS ports concurrently in a slot and an indication of whether the set of concurrent codebooks is associated with single TRP communications or multi-TRP communications; and
wherein transmitting the indication of the one or more CSI-RS capabilities comprises:
transmitting an indication of the one or more sets of concurrent codebooks supported by the UE; and
transmitting, for each set of concurrent codebooks included in the one or more sets of concurrent codebooks, an indication of the one or more CSI-RS capabilities.

8. The method of claim 1,
wherein the one or more CSI-RS capabilities are associated with:
a set of codebook pairs associated with multi-TRP communications supported by the UE; and
for each codebook pair included in the set of codebook pairs, one or more CSI-RS capabilities associated with multi-TRP CSI measurement.

9. The method of claim 8,
wherein transmitting the indication of the one or more CSI-RS capabilities associated with multi-TRP CSI measurement comprises:
transmitting an indication of the set of codebook pairs supported by the UE; and
transmitting one or more CSI-RS capabilities, associated with multi-TRP CSI measurement, for each set of codebook pairs supported by the UE.

10. A method of wireless communication performed by a network entity, comprising:
receiving an indication of one or more channel state information (CSI) reference signal (CSI-RS) capabilities of a user equipment (UE) associated with multiple transmit receive point (multi-TRP) CSI measurement, each CSI-RS capability of the UE indicating at least one of a number of active CSI-RS resources or a number of active CSI-RS ports supported by the UE for multi-TRP CSI measurement, wherein the one or more CSI-RS capabilities associated with multi-TRP CSI measurement are associated with triplets of a maximum number of ports per CSI-RS resource of a band combination, a maximum number of CSI-RS resources supported by the UE for multi-TRP CSI measurement in the band combination, and a total number of ports supported by the UE for multi-TRP CSI measurement in the band combination; and
transmitting a CSI report configuration, or a request, for multi-TRP CSI measurement associated with the UE based at least in part on the one or more CSI-RS capabilities of the UE.

11. The method of claim 10,
wherein receiving the indication of the one or more CSI-RS capabilities of the UE associated with multi-TRP CSI measurement comprises receiving an indication of at least one of:
a number of ports per TRP supported by the UE for multi-TRP CSI measurement,
a number of multi-TRP CSI hypotheses supported by the UE for multi-TRP CSI measurement, or
a total number of ports supported by the UE for multi-TRP CSI measurement.

12. The method of claim 10,
wherein receiving the indication of the one or more CSI-RS capabilities of the UE associated with multi-TRP CSI measurement comprises receiving an indication of:
one or more codebook types supported by the UE, and
one or more CSI-RS capabilities, for each of the one or more codebook types, associated with multi-TRP CSI measurement.

13. The method of claim 10,
wherein receiving the indication of the one or more CSI-RS capabilities of the UE associated with multi-TRP CSI measurement comprises receiving an indication of at least one of:
a number of ports per CSI-RS resource supported by the UE for multi-TRP CSI measurement, or
a number of ports per CSI-RS port group supported by the UE for multi-TRP CSI measurement.

14. The method of claim 10,
wherein receiving the indication of the one or more CSI-RS capabilities of the UE associated with multi-TRP CSI measurement comprises receiving an indication of at least one of:
a number of CSI-RS resources supported by the UE for multi-TRP CSI measurement,
a number of CSI-RS port group pairs supported by the UE for multi-TRP CSI measurement, or
a number of CSI-RS resource pairs supported by the UE for multi-TRP CSI measurement.

15. The method of claim 10,
wherein receiving the indication of the one or more CSI-RS capabilities of the UE associated with multi-TRP CSI measurement comprises:
receiving an indication of one or more CSI-RS capabilities of the UE, per frequency band supported by the UE, associated with multi-TRP CSI measurement.

16. A user equipment (UE) for wireless communication, comprising:
a memory; and
one or more processors coupled to the memory, the one or more processors configured to:
transmit an indication of one or more channel state information (CSI) reference signal (CSI-RS) capabilities associated with multiple transmit receive point (multi-TRP) CSI measurement, each CSI-RS capability indicating at least one of a number of active CSI-RS resources or a number of active CSI-RS ports supported by the UE for multi-TRP CSI measurement, wherein the one or more CSI-RS capabilities associated with multi-TRP CSI measurement are associated with triplets of a maximum number of ports per CSI-RS resource of a band combination, a maximum number of CSI-RS resources supported by the UE for multi-TRP CSI measurement in the band combination, and a total number of ports supported by the UE for multi-TRP CSI measurement in the band combination; and receive a CSI-RS reporting configuration, or a request, for multi-TRP CSI measurement that is based at least in part on the indication of the one or more CSI-RS capabilities associated with multi-TRP CSI measurement.

17. A network entity for wireless communication, comprising:
a memory; and
one or more processors coupled to the memory, the one or more processors configured to:
receive an indication of one or more channel state information (CSI) reference signal (CSI-RS) capabilities of a user equipment (UE) associated with multiple transmit receive point (multi-TRP) CSI measurement, each CSI-RS capability of the UE indicating at least one of a number of active CSI-RS resources or a number of active CSI-RS ports supported by the UE for multi-TRP CSI measurement, wherein the one or more CSI-RS capabilities associated with multi-TRP CSI measurement are associated with triplets of a maximum number of ports per CSI-RS resource of a band combination, a maximum number of CSI-RS resources supported by the UE for multi-TRP CSI measurement in the band combination, and a total number of ports supported by the UE for multi-TRP CSI measurement in the band combination; and
transmit a CSI report configuration, or a request, for multi-TRP CSI measurement associated with the UE based at least in part on the one or more CSI-RS capabilities of the UE.

18. The UE of claim 16,
wherein the one or more CSI-RS capabilities associated with multi-TRP CSI measurement are associated with one or more sets of concurrent codebooks supported by the UE, wherein a set of concurrent codebooks included in the one or more set of concurrent codebooks, includes two or more codebooks whose associated CSI-RSs are to be counted towards active CSI-RS resources and CSI-RS ports concurrently in a slot, at least one codebook of the two or more codebooks being a codebook pair, and an indication of whether the set of concurrent codebooks is associated with single TRP communications or multi-TRP communications; and
wherein the one or more processors, to transmit the indication of the one or more CSI-RS capabilities, are configured to:
transmit an indication of the one or more sets of concurrent codebooks supported by the UE; and
transmit, for each set of concurrent codebooks included in the one or more sets of concurrent codebooks, an indication of one or more CSI-RS capabilities.

19. The UE of claim 16,
wherein the CSI-RS reporting configuration, or the request, indicates at least one of one or more CSI-RS resources, one or more CSI-RS ports, or one or more CSI-RS port groups.

20. The UE of claim 16,
wherein the one or more CSI-RS capabilities are associated with at least one of:
one or more CSI-RS capabilities associated with spatial division multiplexing (SDM) multi-TRP CSI measurement, wherein SDM multi-TRP CSI measurement comprises calculating two precoding matrix indicators (PMIs) assuming different layers of a transmission associated with the two PMIs are transmitted on a same frequency domain resource and a same time domain resource,
one or more CSI-RS capabilities associated with single frequency network (SFN) multi-TRP CSI measurement, wherein SFN multi-TRP CSI measurement comprises calculating two PMIs assuming one or more layers of a transmission associated with the two PMIs are transmitted on a same frequency domain resource and a same time domain resource,
one or more CSI-RS capabilities associated with frequency division multiplexing (FDM) multi-TRP CSI measurement, wherein FDM multi-TRP CSI measurement comprises calculating two PMIs assuming one or more layers of a transmission associated with the two PMIs are transmitted on different frequency domain resources, or
one or more CSI-RS capabilities associated with time division multiplexing (TDM) multi-TRP CSI measurement, wherein TDM multi-TRP CSI measurement comprises calculating two PMIs assuming one or more layers of a transmission associated with the two PMIs are transmitted on different time domain resources.

21. The UE of claim 16,
wherein the one or more processors, to transmit the indication of the one or more CSI-RS capabilities associated with multi-TRP CSI measurement, are configured to transmit an indication of at least one of:
one or more CSI-RS capabilities associated with spatial division multiplexing multi-TRP CSI measurement,
one or more CSI-RS capabilities associated with single frequency network multi-TRP CSI measurement,
one or more CSI-RS capabilities associated with frequency division multiplexing multi-TRP CSI measurement, or
one or more CSI-RS capabilities associated with time division multiplexing multi-TRP CSI measurement.

22. The UE of claim 16,
wherein the one or more processors, to transmit the indication of the one or more CSI-RS capabilities associated with multi-TRP CSI measurement, are configured to:
transmit an indication of one or more scaling factors associated with the one or more CSI-RS capabilities, wherein a scaling factor indicates a number of times that a CSI-RS resource or CSI-RS port are to be counted towards a number of active CSI-RS resources or active CSI-RS ports when used by the UE for multi-TRP CSI measurement.

23. The UE of claim 16,
wherein the one or more processors, to transmit the indication of the one or more CSI-RS capabilities associated with multi-TRP CSI measurement, are configured to:
transmit an indication of one or more scaling factors that are to be applied if a CSI-RS resource or CSI-RS port is used for single TRP CSI measurement and multi-TRP CSI measurement.

24. The UE of claim 16,
wherein the one or more processors, to transmit the indication of the one or more CSI-RS capabilities associated with multi-TRP CSI measurement, are configured to:
  transmit an indication of one or more scaling factors that are to be applied if a CSI-RS resource or CSI-RS port is used for multi-TRP CSI measurement.

25. The UE of claim 16,
wherein the one or more processors, to transmit the indication of the one or more CSI-RS capabilities associated with multi-TRP CSI measurement, are configured to transmit an indication of at least one of:
  one or more scaling factors per frequency band supported by the UE, or
  one or more scaling factors per frequency band combination supported by the UE.

26. The network entity of claim 17,
wherein the one or more processors, to receive the indication of the one or more CSI-RS capabilities of the UE associated with multi-TRP CSI measurement, are configured to:
  receiving an indication of one or more CSI-RS capabilities of the UE, per frequency band combination supported by the UE, associated with multi-TRP CSI measurement.

27. The network entity of claim 17,
wherein the one or more processors, to receive the indication of the one or more CSI-RS capabilities of the UE associated with multi-TRP CSI measurement, are configured to receive an indication of:
  one or more sets of concurrent codebooks supported by the UE, wherein a set of concurrent codebook, included in the one or more sets of concurrent codebooks, includes two or more codebooks and an indication of whether the set of concurrent codebooks is associated with single TRP communications or multi-TRP communications; and
  one or more CSI-RS capabilities of the UE, for each set of concurrent codebooks included in the one or more sets of concurrent codebooks, associated with multi-TRP CSI measurement.

28. The network entity of claim 17,
wherein the one or more processors, to receive the indication of the one or more CSI-RS capabilities of the UE associated with multi-TRP CSI measurement, are configured to receive an indication of:
  one or more sets of concurrent codebooks supported by the UE, wherein a set of concurrent codebooks, included in the one or more set of concurrent codebooks, includes two or more codebooks whose associated CSI-RSs are to be counted towards active CSI-RS resources and CSI-RS ports concurrently in a slot, at least one codebook of the two or more codebooks being a codebook pair, and an indication of whether the set of concurrent codebooks is associated with single TRP communications or multi-TRP communications; and
  one or more CSI-RS capabilities of the UE, associated with multi-TRP CSI measurement, corresponding to each of the one or more sets of concurrent codebooks supported by the UE.

29. The network entity of claim 17,
wherein the one or more processors, to receive the indication of the one or more CSI-RS capabilities of the UE associated with multi-TRP CSI measurement, are configured to receive an indication of:
  a set of codebook pairs associated with multi-TRP communications supported by the UE; and
  one or more CSI-RS capabilities of the UE, for each codebook pair included in the set of codebook pairs, associated with multi-TRP CSI measurement.

30. The network entity of claim 17,
wherein the one or more processors, to receive the indication of the one or more CSI-RS capabilities of the UE associated with multi-TRP CSI measurement, are configured to:
  receive an indication of one or more scaling factors that are to be applied if a CSI-RS resource or CSI-RS port is used by the UE for multi-TRP CSI measurement.

\* \* \* \* \*